United States Patent
Vrzalik et al.

(10) Patent No.: US 6,536,056 B1
(45) Date of Patent: *Mar. 25, 2003

(54) BARIATRIC TREATMENT SYSTEM AND RELATED METHODS

(76) Inventors: John H. Vrzalik, 4444 Lane St., San Antonio, TX (US) 78263; Alan Bartlett, 4415 River Oaks, New Braunfels, TX (US) 78132; Bruce Phillips, 14622 Mountain Wood, San Antonio, TX (US) 78232; Michael Stenberg, 6403 Lost Arbor, San Antonio, TX (US) 78240; Glenn C. Stroh, 7958 FM 1044, Marion, TX (US) 78123; Daniel A. Woehr, 4618 Pinecomb Woods, San Antonio, TX (US) 78249; Dan G. Dimitriu, 14211 Daylight Ridge, San Antonio, TX (US) 78230

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,209

(22) Filed: Nov. 17, 1997

Related U.S. Application Data

(60) Provisional application No. 60/031,666, filed on Nov. 21, 1996, and provisional application No. 60/031,408, filed on Nov. 18, 1996.

(51) Int. Cl.[7] .................................................. A61G 7/00
(52) U.S. Cl. ........................ 5/615; 5/624; 5/618; 5/613
(58) Field of Search ............................ 5/615, 607, 608, 5/609, 610, 611, 613, 616, 617, 624, 715

(56) References Cited

U.S. PATENT DOCUMENTS

| | | | |
|---|---|---|---|
| 1,772,310 A | | 8/1930 | Hart |
| 3,195,151 A | * | 7/1965 | Boyer .............................. 5/624 |
| 3,336,606 A | * | 8/1967 | Beitzel ............................ 5/610 |
| 3,426,373 A | | 2/1969 | Scott et al. ..................... 5/348 |

(List continued on next page.)

OTHER PUBLICATIONS

Burke, Inc., Advertising Material; *The Burke Bariatric Treatment System*, Date unkown.

Burke, Inc., Advertising Material; *The Burke Big Boy Bed*, Date unkown.

SMI , Advertising Material; *Introducing Megabed 1000*, Date unknown.

PCT International Search Report; PCT International application PCT/US97/21285; Apr. 7, 1998.

PCT Written Opinion; PCT International application PCT/US97/21285; Oct. 13, 1998.

PCT International Preliminary Examination Report; PCT International application PCT/US97/21285; Feb. 11, 1999.

KCI Therapeutic Services, *Pressure Reduction With Air Therapy*, Jan. 1991.

*Primary Examiner*—Michael F. Trettel

(57) ABSTRACT

A bariatric treatment system providing a comprehensive array of therapeutic services for the morbidly obese patient is disclosed. The treatment system generally comprises a stable bed frame upon which is mounted a low air loss therapeutic mattress system. Integrated hardware and software controls provide such therapies as pulsation, percussion, rotation, cardiac chair and Trendelenburg. Means are disclosed whereby the bariatric patient may safely and comfortably enter and exit the bed with relative ease. The bed is adaptable for transport within a hospital, including such features as a TRANSPORT MODE wherein the bed's lateral axis is minimized and battery backup to maintain necessary therapies during patient transport. A plurality of control means are disclosed for simplification of caregiver workload and ease of patient utilization.

21 Claims, 39 Drawing Sheets

U.S. PATENT DOCUMENTS

| | | | |
|---|---|---|---|
| 3,485,240 A | 12/1969 | Fountain | 128/33 |
| 3,492,988 A | 2/1970 | De Mare | 128/33 |
| 3,935,604 A | 2/1976 | Collins | 5/90 |
| 4,227,269 A * | 10/1980 | Johnston | 5/616 X |
| 4,376,317 A * | 3/1983 | Johnston | 5/616 X |
| 4,409,695 A | 10/1983 | Johnston et al. | 5/68 |
| 4,494,259 A * | 1/1985 | Miller et al. | 5/616 |
| 4,669,136 A * | 6/1987 | Waters et al. | 5/607 X |
| 4,793,428 A | 12/1988 | Swersey | 177/144 |
| 4,847,929 A | 7/1989 | Pupovic | 5/62 |
| 4,858,260 A | 8/1989 | Failor et al. | 5/67 |
| 4,862,529 A | 9/1989 | Peck | 5/63 |
| 4,941,221 A * | 7/1990 | Kanzler | 5/615 |
| 4,977,629 A * | 12/1990 | Jones | 5/715 X |
| 4,989,283 A | 2/1991 | Krouskop | 5/453 |
| 5,023,967 A | 6/1991 | Ferrand | 5/62 |
| 5,090,077 A | 2/1992 | Caden et al. | 5/456 |
| 5,092,007 A | 3/1992 | Hasty | 5/453 |
| 5,157,787 A * | 10/1992 | Donnellan et al. | 5/610 |
| 5,279,010 A * | 1/1994 | Ferrand et al. | 5/610 X |
| 5,394,577 A | 3/1995 | James et al. | 5/445 |
| 5,454,126 A | 10/1995 | Foster et al. | 5/618 |
| 5,487,196 A | 1/1996 | Wilkinson et al. | 5/453 |
| 5,542,138 A | 8/1996 | Williams et al. | 5/658 |
| 5,560,374 A | 10/1996 | Viard | 128/845 |
| 5,586,346 A * | 12/1996 | Stacy et al. | 5/715 X |
| 5,611,096 A * | 3/1997 | Bartlett et al. | 5/617 |
| 5,630,238 A | 5/1997 | Weismiller et al. | 5/600 |
| 5,647,079 A | 7/1997 | Hakamiun et al. | 5/713 |

* cited by examiner

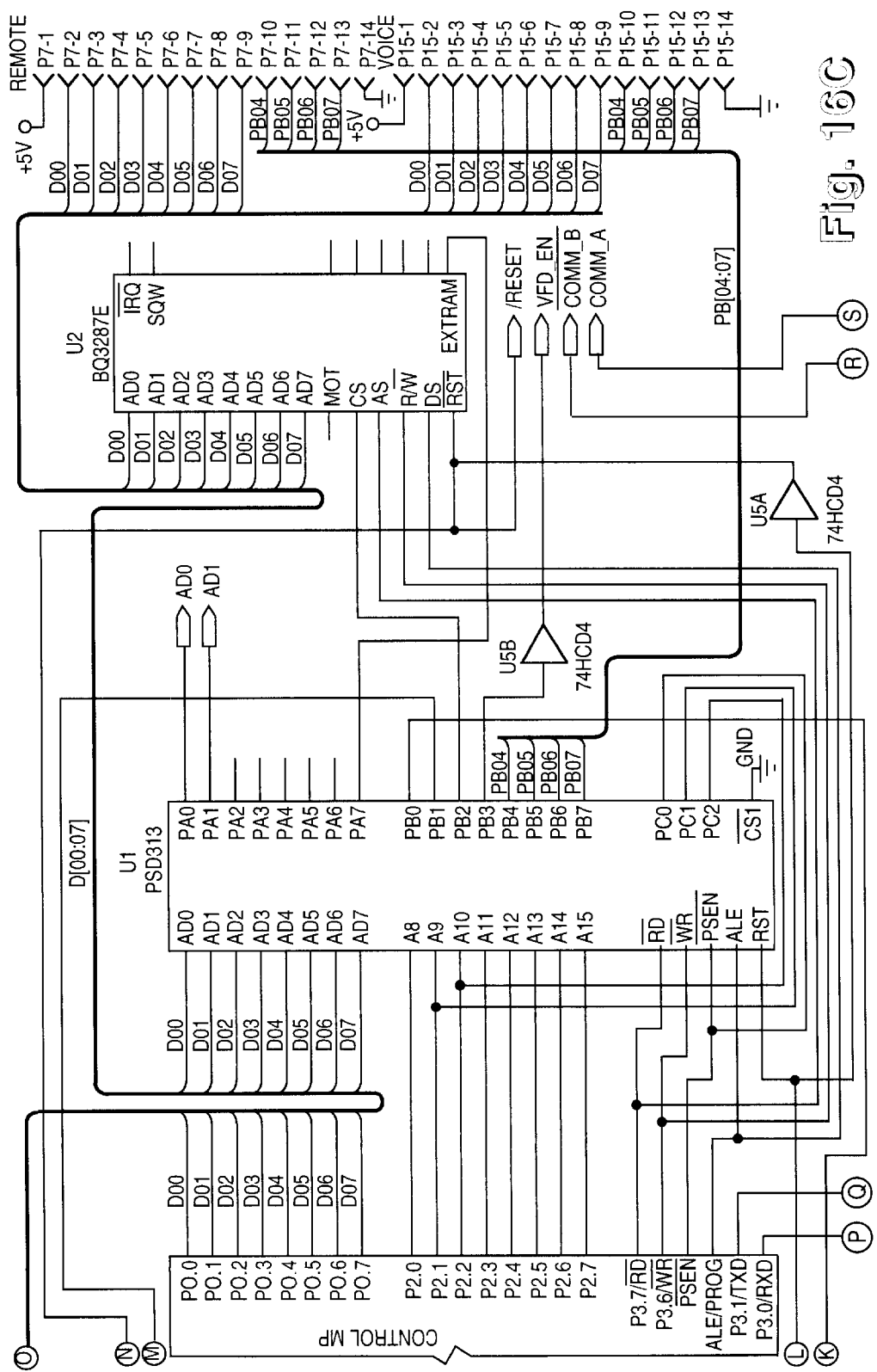

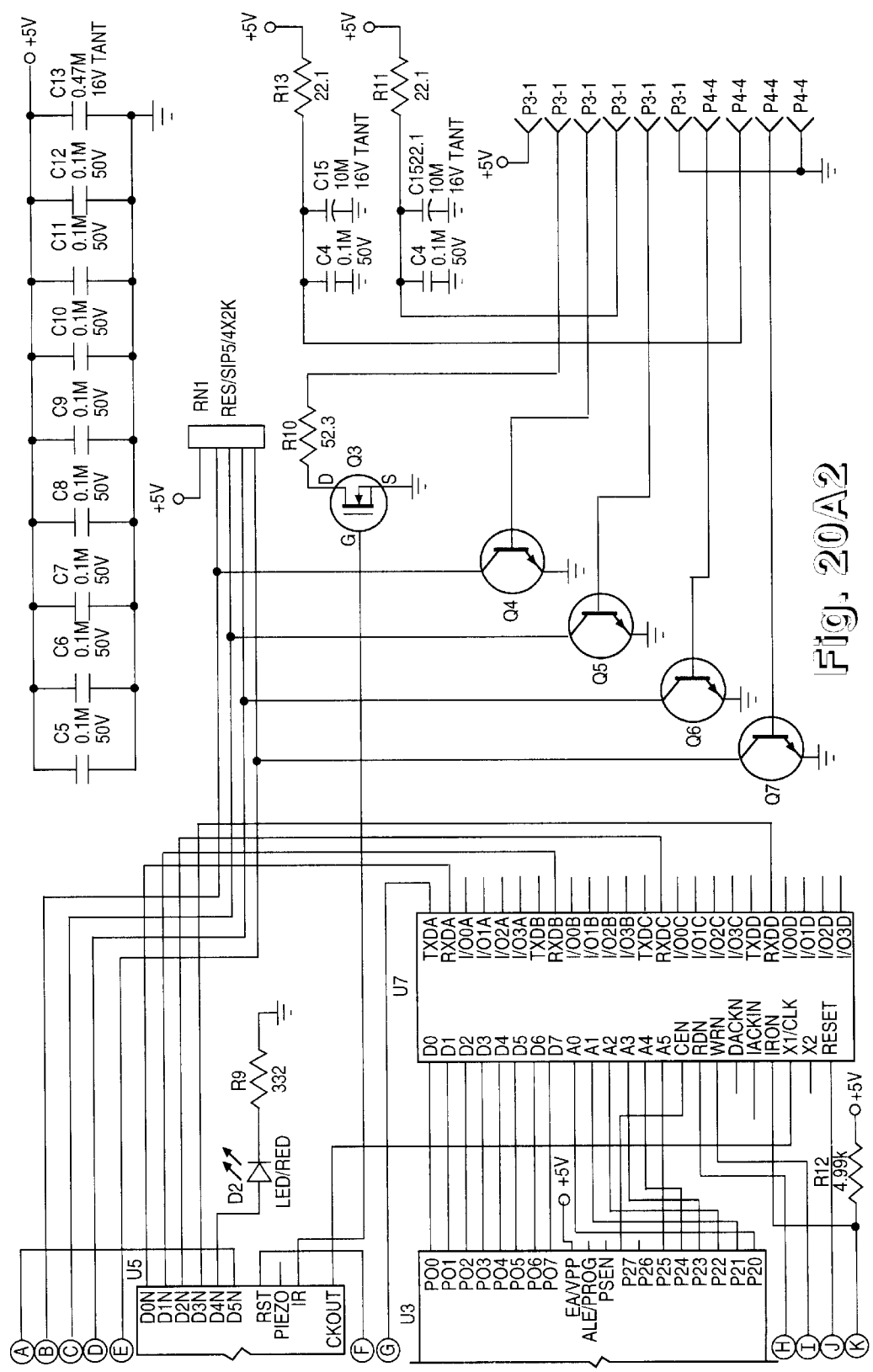
Fig. 20A2

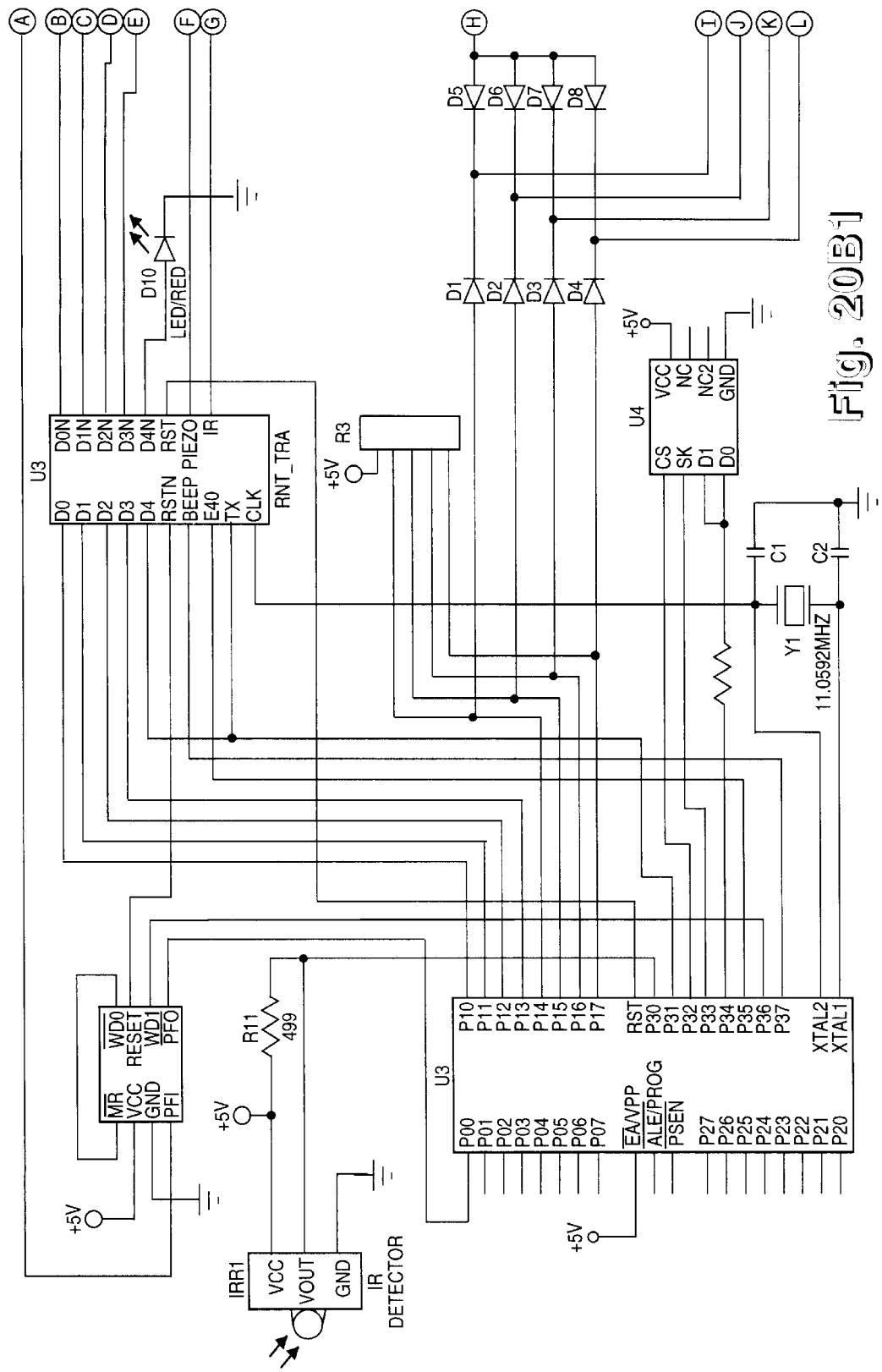
Fig. 20B1

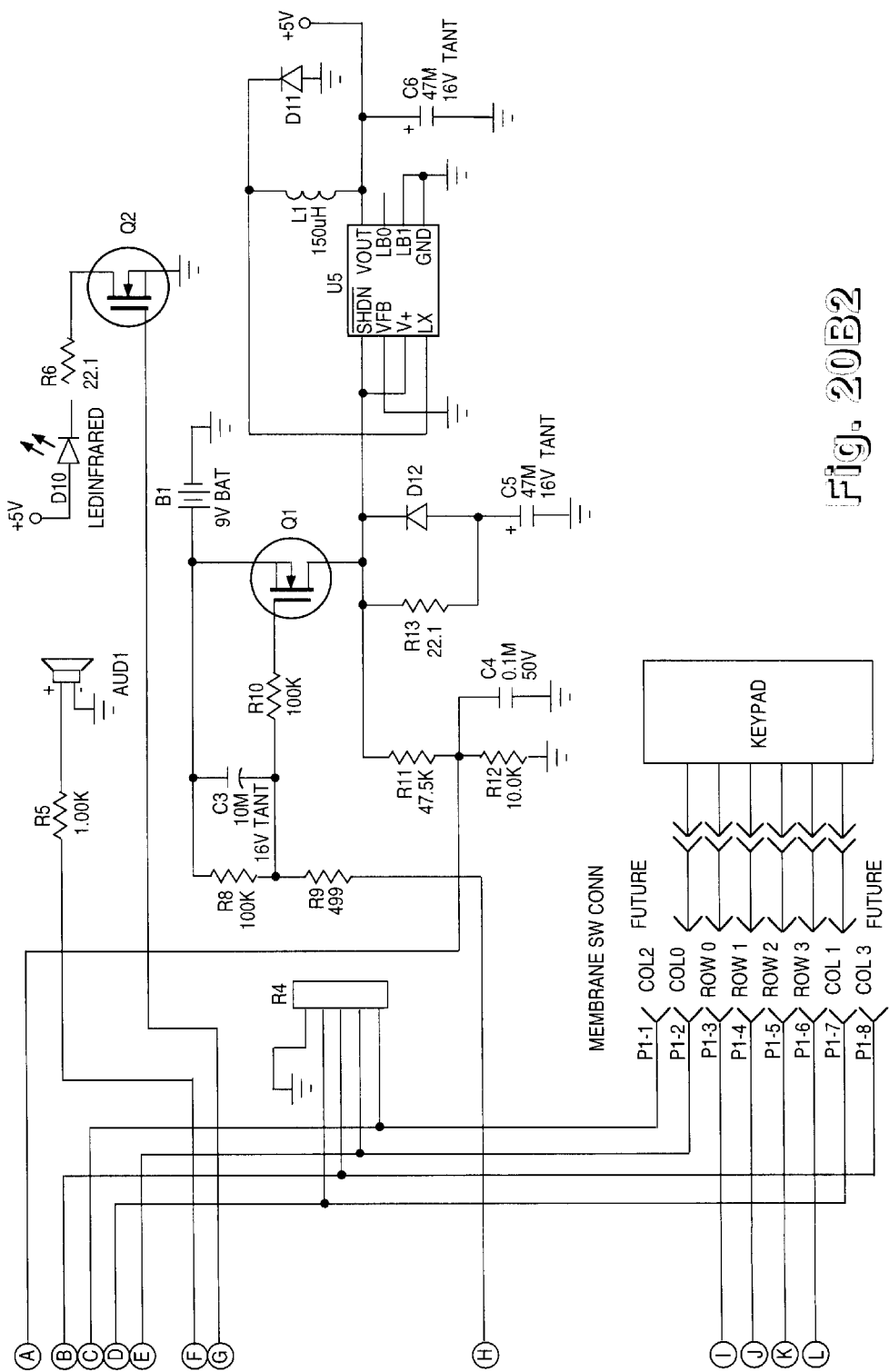
Fig. 20B2

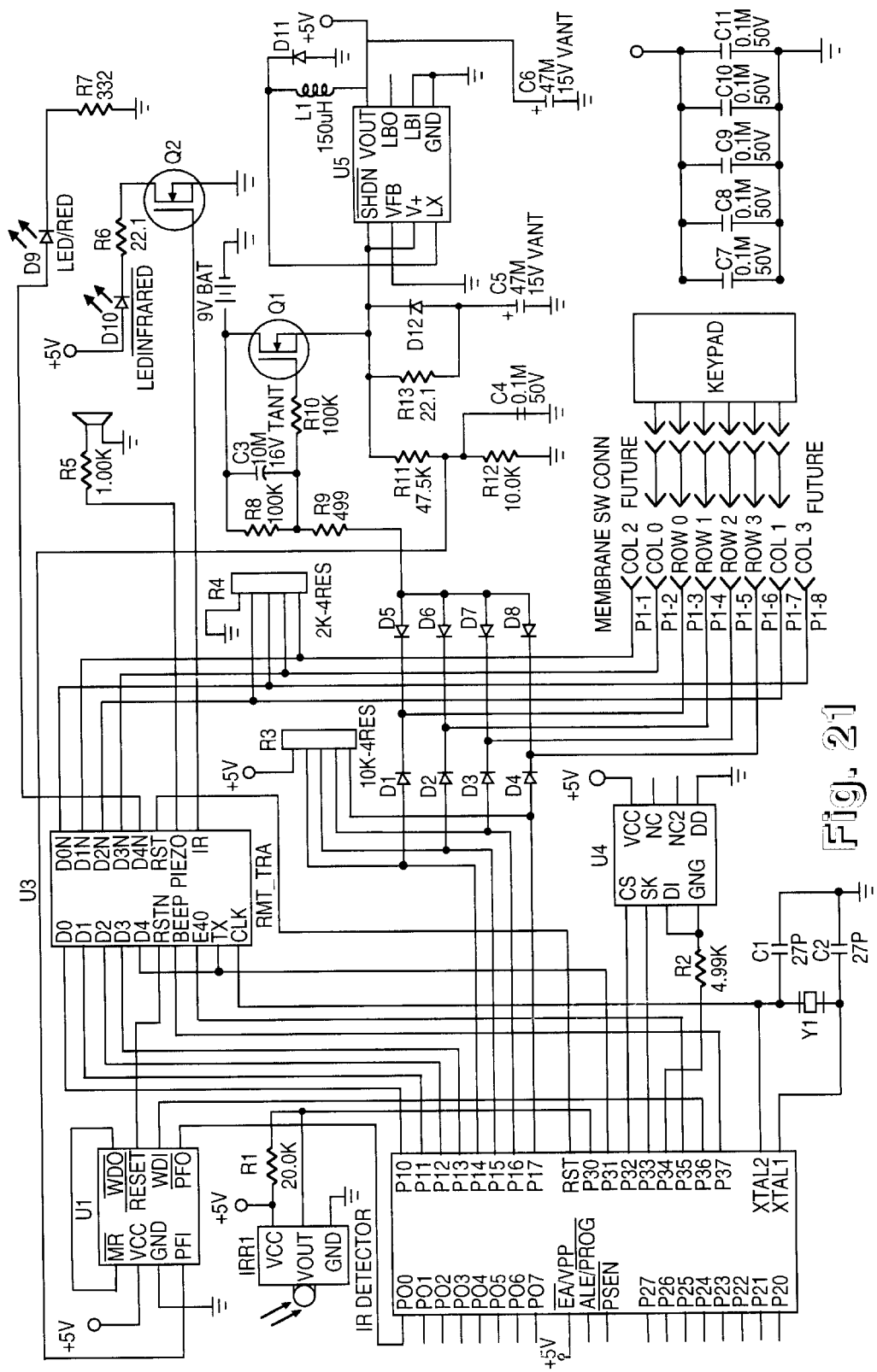

BARIATRIC TREATMENT SYSTEM AND RELATED METHODS

RELATED APPLICATIONS

The present invention claims, under 35 USC §119(e), all available benefit of U.S. provisional patent applications Ser. No. 60/031,408 filed Nov. 18, 1996 and Ser. No. 60/031,666 filed Nov. 21, 1996.

BACKGROUND OF THE INVENTION

1. Field of the Invention

The present invention relates to bariatric patient beds having apparatus and methods for monitoring and/or controlling therapeutic mattress systems and the patients supported thereon and, more particularly, to such bariatric beds having features for facilitating the care, support and comfort of the bariatric patient through monitoring of angular deviations of the mattress surface and patient from the flat, horizontal position and control of the mattress system in response thereto.

2. Description of Background Art

The treatment of morbidly obese, or bariatric, patients presents many challenges heretofore not adequately addressed. These patients, typically weighing in excess of 500 pounds and often in the range of 500 to 800 pounds, have previously been denied many of the available therapeutic modalities due primarily to the difficulties associated with effecting such treatments in a treatment system capable of withstanding these patients' great weights. The emphasis of previous systems has been to confront the obstacles concomitant handling of the bariatric patient; this focus has resulted in a void of developments for providing therapeutic care for the bariatric patient.

It is therefore an overriding object of the present invention to improve over the teachings of the prior art in the provision of a plurality of therapeutic services for the bariatric patient. It is further an object of the present invention to provide these therapies on a safe, comfortable, efficient platform adaptable to a variety of circumstances and treatment environments.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein:

FIGS. 16A, 16B, 16C, 16D, 17A, 17B, 17C, 17D, 17E, 18A, 18B, 18C, 18D, 18E, 18F, 19A, 19B, 19C, 19D, 20A1, 20A2, 20B1 and 20B2 show various detailed schematic diagrams of the various control boards utilized in the preferred embodiment 100, each of which is specifically referenced in the specification which follows.

DETAILED DESCRIPTION OF THE PREFERRED EMBODIMENT

Figure 1:
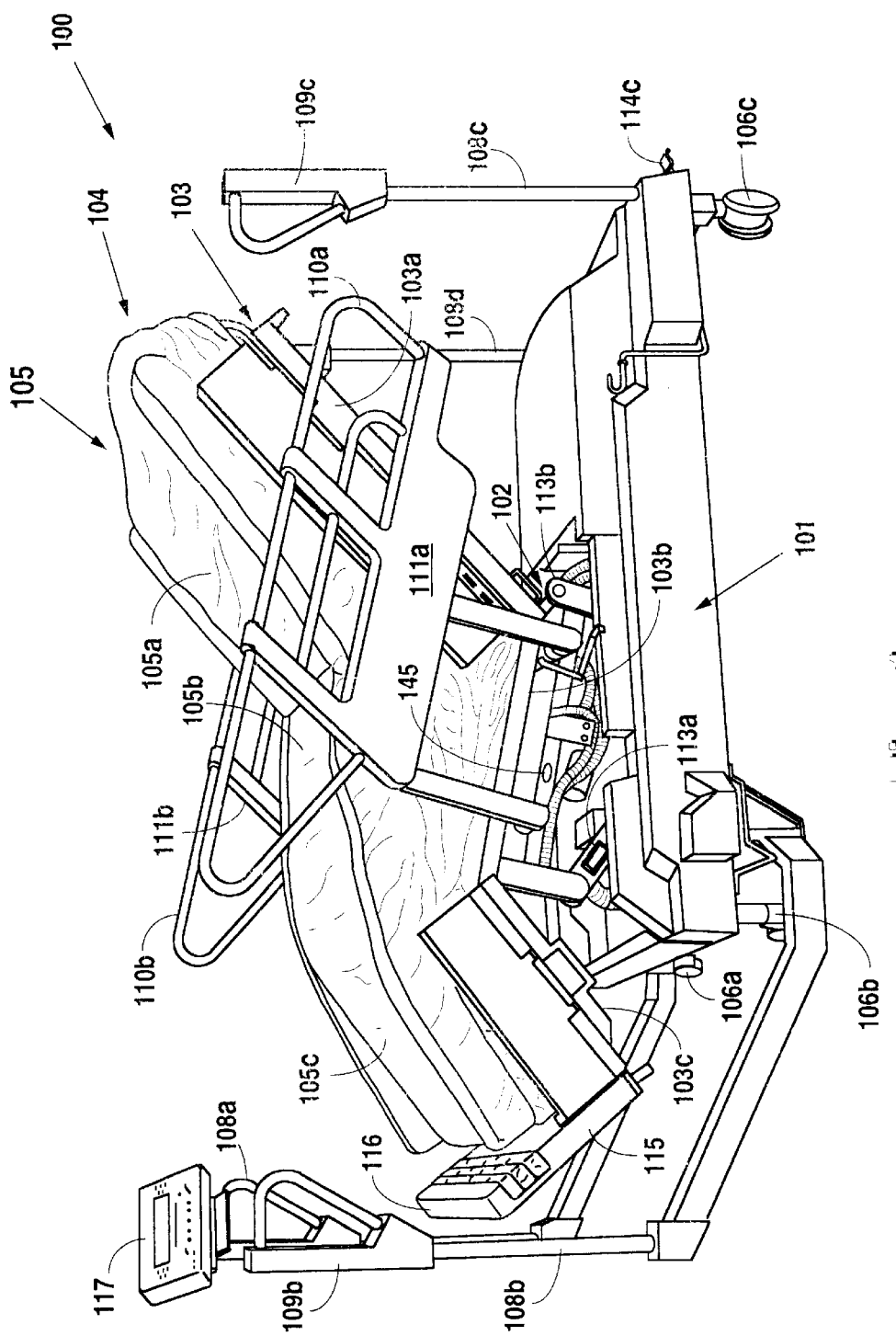
FIGS. 1, 2, 3, 4, 5, 6, and 7A show various perspective views of the preferred embodiment of the present invention, a bariatric treatment system 100.

By this reference, the specifications of U.S. patent application Ser. No. 08/673,442, filed Jun. 28, 1996, and U.S. patent application Ser. No. 08/382,150, filed Jan. 31, 1995, are incorporated herein as if each were now set forth in its respective entirety.

Although those of ordinary skill in the art will readily recognize many alternative embodiments, especially in light of the illustration provided herein, this detailed description is exemplary of the presently preferred embodiment of the present invention, the scope of which is limited only by the claims appended hereto. The preferred embodiment of the present invention, a bariatric patient therapeutic treatment system 100, generally comprises a treatment bed uniquely indicated for bariatric patients, i.e, patients weighing in excess of 500 pounds, commonly in the range of 500–800 pounds. The frame of the bed generally comprises a base frame 101, a load frame 102 and various assemblies. The basic mattress 104, or "patient surface," of the bed consists of a specialty low air loss mattress providing a comprehensive system of pulmonary and skin care therapies for the critically ill, immobilized patient 118. Such therapies include gentle side-to-side rotation of a patient, percussion (or vibration) therapy, and gentle pulsation of the air cells supporting the patient. The system further comprises an automated CPR mode which is activated and deactivated via a plurality of CPR mode activation controls. The detailed operation of the CPR mode activation system will be apparent further herein.

Frame assemblies 103 and accompanying patient surfaces 105 provide support for the patient's head and back, buttocks, and legs and feet. A provided head and X-ray assembly 103a further comprises a mechanism for holding an X-ray cassette, detailed further herein. A provided seat assembly 103b further comprises a set of jack motors used to adjust the angular orientation relative to seat assembly 103b of head and X-ray assembly 103a and leg assembly 103c, as will be evident further herein. A provided foot board assembly 115 is dependently attached to the leg assembly 103c by means providing useful benefit to both the patient 118 and caregiver, also detailed further herein.

The base frame 101 generally comprises longitudinal beams and transverse elements. The base frame 101 further comprises a plurality of floor-engaging casters 106, conventionally journaled near the four corners of said frame. Locking mechanisms 114 are provided for the casters 106. Such locking mechanisms 114 may be set to prevent either rotation or steering of the casters 106, hence holding bed 100 stationary, as is conventional with many hospital bed frames. Weldments are provided which allow location of corner posts 108 on which may be installed intravenous injection (IV) holders or standard traction frames. The corner posts 108 are adapted with convenient integral hand holds to facilitate patient entrance or exit of the bed 100. The hand holds, as provided by the corner posts, may also assist caregivers in transport of the bed 100. The bed's controls are contained in a 360 degree swivel mounted on either foot corner post 108a, 108b. The swivel allows the controller 117 to be moved out of harm's way during transport through doors and hallways. Because the swivel provides flexibility in location and orientation of the controls, the need for multiple control panels is eliminated. Elimination of multiple control panels eliminates complicated wiring schemes and reduces overall failure modes.

Molded plastic covers 109 enhance aesthetic appeal and provide convenient locations for affixing instruction 129 or warning labels. Bumpers made of rubber or other similar materials may also be installed on covers 109 for protection of both bed and the walls and doorways of the facility where the bed 100 is used.

The load frame 102 generally comprises longitudinally disposed beams and transverse elements. Additional transverse elements are used for attachment of jack motors. The description and function of such motors will be apparent further herein. The load frame 102 is referred to as such because it carries the entire load of the patient surface. It dependently attaches to the base frame 101 in a way that weighs that load as it is transmitted to the base frame 101. That connection between the load frame 102 and the base frame 101 is provided by a scale mechanism well known in the art and similar to that described in U.S. Pat. No. 4,793,428, incorporated herein by this reference as though now set forth in its entirety. The scale mechanism generally comprises a pair of displacement transmitting members which are respectively connected between transverse elements via flexures.

Each transmitting member is attached to a base frame element via a flexure and also to a load frame element via a flexure. Attachment in this manner causes displacement of bars which are connected to the members in a cantilevered manner. Displacement, which is limited by springs, is measured in the area of the springs by linear variable differential transformers (LVDTs). Displacement measured by the LVDTs corresponds in direct proportion to the weight of the load frame and all which is supported thereby. A locking mechanism comprising common hardware is desired to prevent motion of the load frame 102 relative to the base frame 101 during transport of bed 100. This serves to prevent damage of the scale mechanism due to excessive forces as may be encountered when attempting to negotiate a short step or the like. Other conventional mechanical stops are used to limit movement and prevent damage in normal use, when the locking mechanism is not utilized.

A raise-and-lower mechanism produces vertical movement and Trendelenburg tilting of the seat assembly 103b. In particular, a head torque arm weldment and a foot torque arm weldment are pivotally attached to the load frame 102. The seat assembly 103b is dependently attached to weldments by members. Specifically, the foot torque arm weldment connects at points to members by bushings and other necessary hardware as is well known in the art of manufacturing hospital beds. The head torque arm and foot torque arm weldments are articulated about their pivotal attachments to the load frame by extension or retraction of jack tubes (or "sleeves") by jack motors. The jack motors, of the type referred to in the industry as linear actuators, attach the transverse members of the load frame by torque arm pins, themselves affixed by cotter pins.

Extension of either tube by the corresponding motor causes the attached weldment to pivot relative to the load frame 102 such that the connection points of the corresponding members articulate upwardly. Retraction of either tube would have the opposite effect, that of lowering the members. Said articulation has the effect of causing the members to raise or lower in vertical motion, thereby raising or lowering seat assembly 103b in vertical motion. In the preferred embodiment, such articulation as raises seat assembly 103b is said to provide a BED UP function. Such articulation as lowers seat assembly 103b is said to provide a BED DOWN function. It is believed that the system described herein, having mechanically articulated attachment points at the four corners of the seat assembly 103b, promotes greater stability than would a system utilizing hydraulic type cylinders wherein the support is typically concentrated along a single longitudinal axis.

Articulation by one jack motor greater or less than that of the other jack motor has the effect of establishing the patient support surface 105 in a Trendelenburg or reverse Trendelenburg treatment position. Trendelenburg and reverse Trendelenburg therapy is well know in the art for treatment of certain cardiac conditions and is considered an important feature for many conventional hospital beds, although the excessive weight of bariatric patients has led the art away from incorporating such features in a bariatric bed. The preferred embodiment 100 is capable of achieving ten degrees Trendelenburg or twelve and one half degrees reverse Trendelenburg therapy. Articulation to effect such treatment is referred to as providing the TRENDELENBURG or REVERSE TRENDELENBURG function.

The head assembly 103a is dependently attached to the seat assembly 103b by laterally oriented hinging. Articulation of the head and X-ray assembly 103a about this hinge is effected by extension or retraction of a jack sleeve under the force of a jack motor. The jack motor, of the type referred to in the industry as a linear actuator, dependently attaches to the seat assembly weldment by a pin, itself affixed by a cotter pin. The jack sleeve attaches to the head and X-ray assembly weldment by a pin, itself affixed by a cotter pin. In the preferred embodiment, extension of the jack sleeve is said to provide a HEAD UP function. Retraction of the jack sleeve is said to provide a HEAD DOWN function.

The head assembly 103a for the treatment system generally comprises a rail encompassing a head board. The rail and head board are mated together with weldments. The weldments provide a channel for horizontal containment of an X-ray cassette. The transverse weldment combines with a hinge and another weldment to provide structural support of the head and X-ray assembly. An X-ray board serves to maintain the right-angled shape of the perimetrical structure, thereby facilitating ease of insertion and removal of an X-ray cassette. The X-ray board and head board of the preferred embodiment comprise a radiolucent material. While it is well known in the art of design and manufacture of patient treatment beds to provide a mechanism for holding an X-ray cassette behind the patient's head and chest areas, prior art designs have not improved the means for insertion and removal of the X-ray cassette. Specifically it is desirable to be able to raise or lower the cassette from one side only so that in cases where access to the treatment bed may be limited to one side, by a wall or medical apparatus, for instance, an X-ray cassette still may be easily inserted and subsequently removed. Because prior art embodiments of bariatric beds do not provide mechanisms for keeping the sides of an X-ray cassette parallel with the sides of the holding assembly, the caregiver has been forced to have access to both sides of the treatment bed in order to manually guide the cassette into place. The embodiment 100 detailed herein utilizes a mechanism from other arts to provide a solution to the problem described. A block and pulley system, comprising a left block and right block, plurality of single pulleys, plurality of double pulleys and plurality of cables, allows the X-ray bar to be raised and lowered from just one of a plurality of handles, although nothing prevents two or more handles from being used, all the while maintaining the bar in a position parallel to the transverse element. The handles may lock at a plurality of vertical positions within slots in the channel members. Although referring to an unrelated field of art, the block and pulley system shown is similar to that described in U.S. Pat. No. 5,295,430, incorporated herein by this reference as though here now set forth in its entirety.

The leg assembly 103c is dependently attached to the seat assembly 103b by a laterally oriented hinge. Articulation of the leg assembly 103c about this hinge is effected by extension or retraction of a jack sleeve under the force of a jack motor, of the type referred to in the industry as a linear actuator, which dependently attaches to the seat assembly weldment by a pin, itself affixed by a cotter pin. The jack sleeve attaches to the leg assembly weldment by a pin, itself affixed by a cotter pin. In the preferred embodiment, extension of the jack sleeve is said to provide a LEGS UP function. Retraction of the jack sleeve is said to provide a LEGS DOWN function. The leg assembly is detailed further herein with discussion of the foot board assembly.

Figure 5:
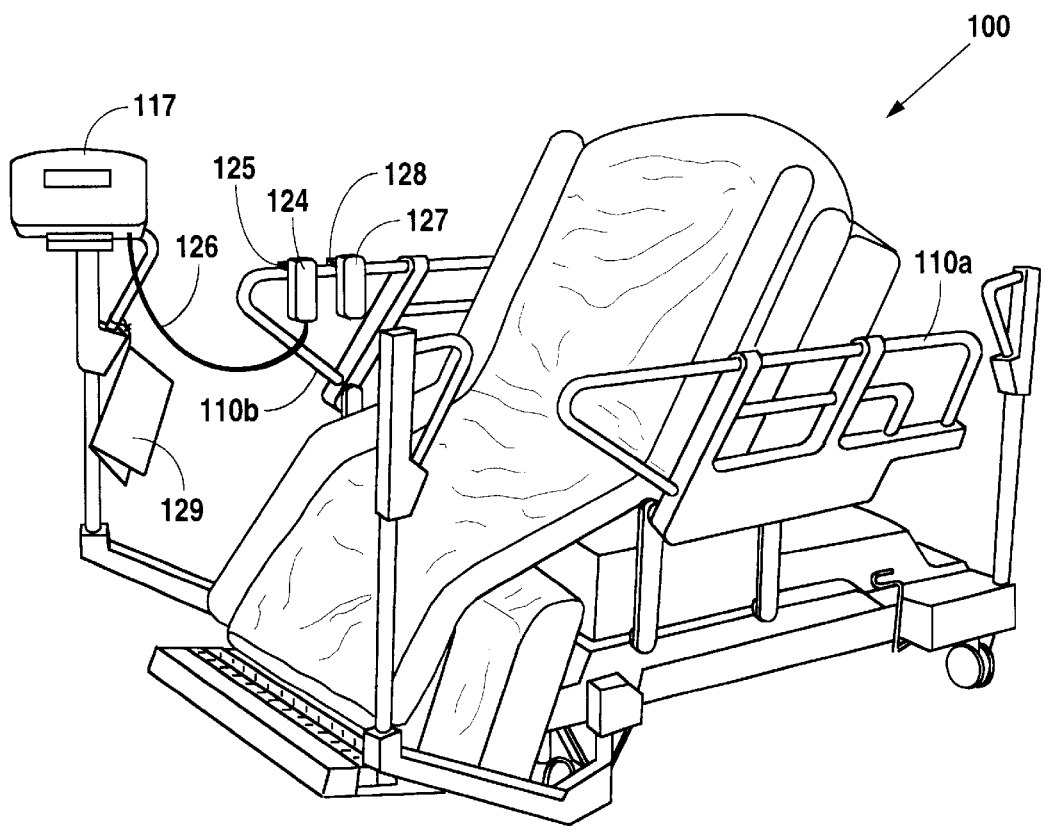
Figure 6:
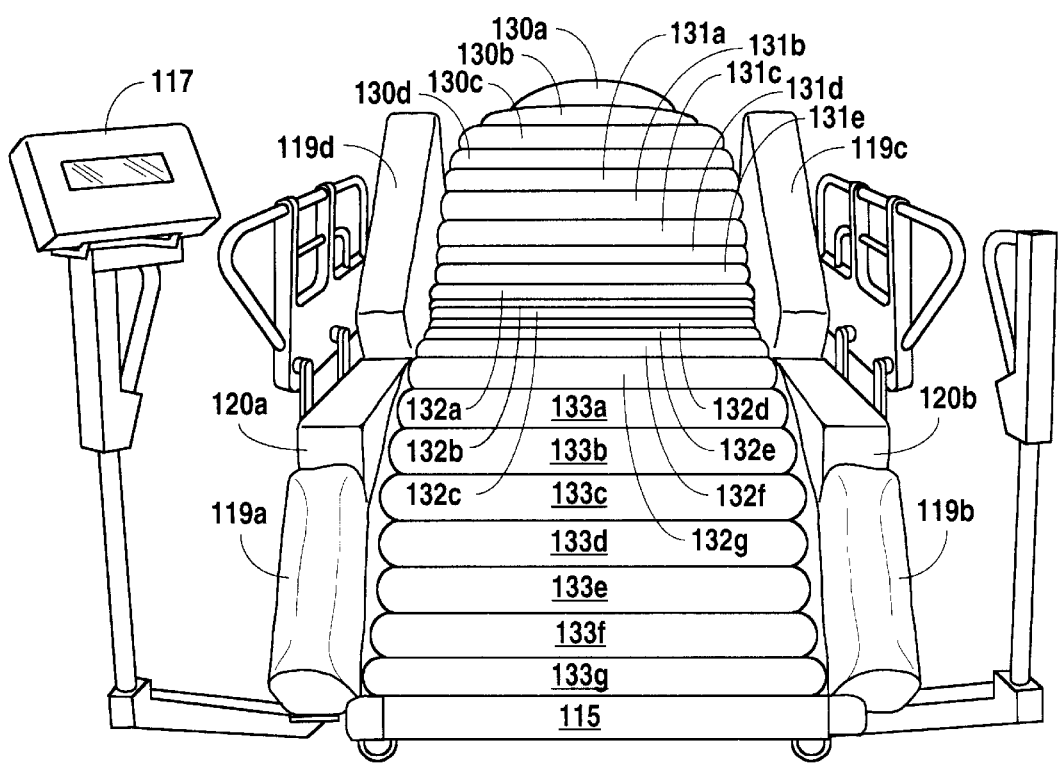
Figure 7:
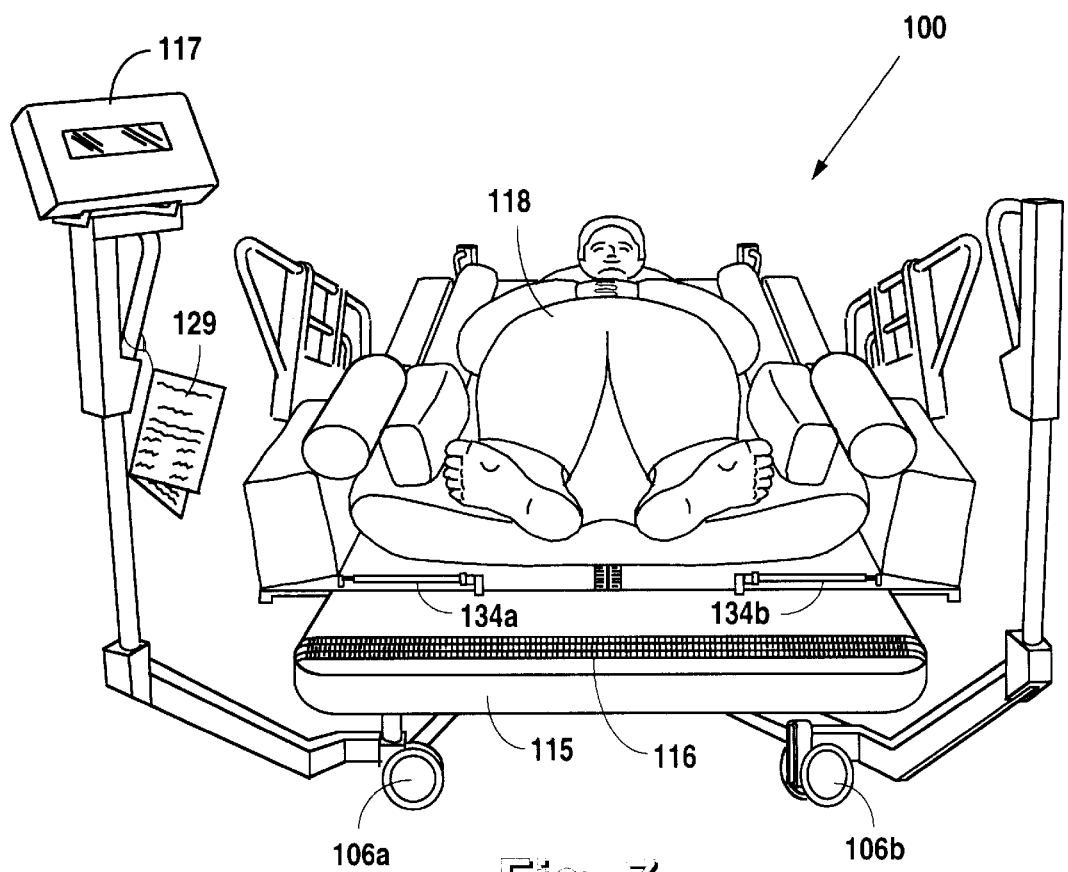
Figure 7A:
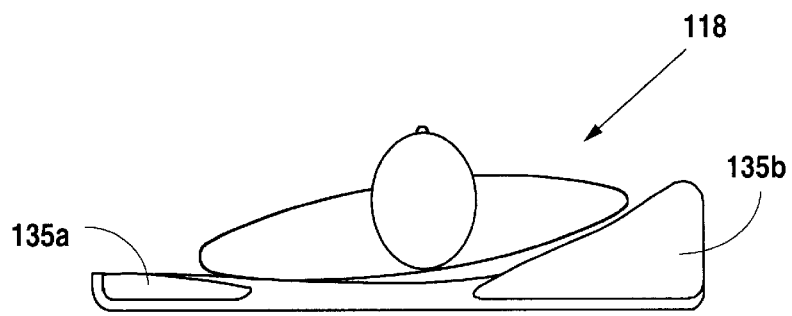
Figure 8:
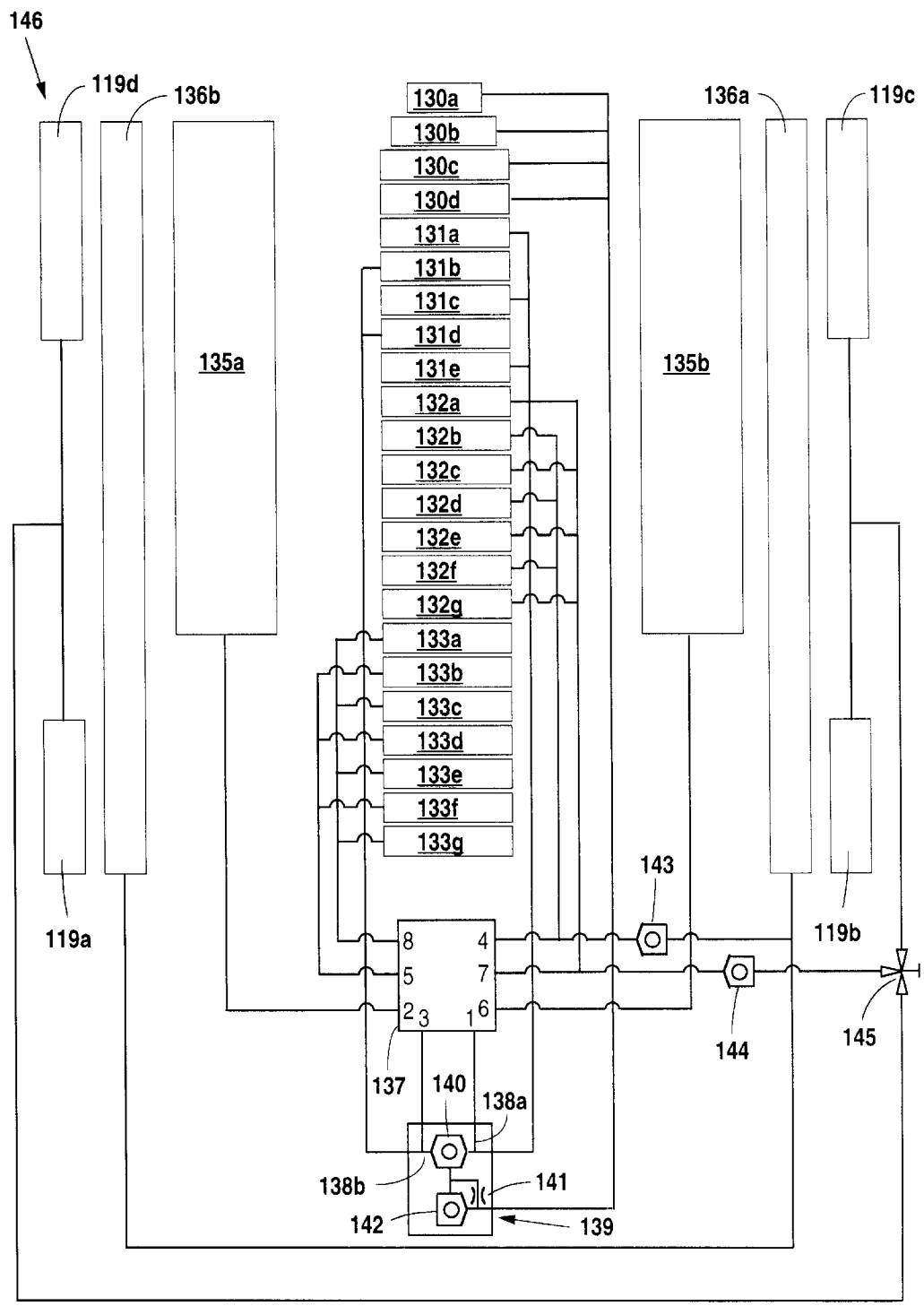
FIG. 8 shows the inflation structure 146 of the therapeutic support surface 104 of the bariatric treatment system 100.
Figure 9:
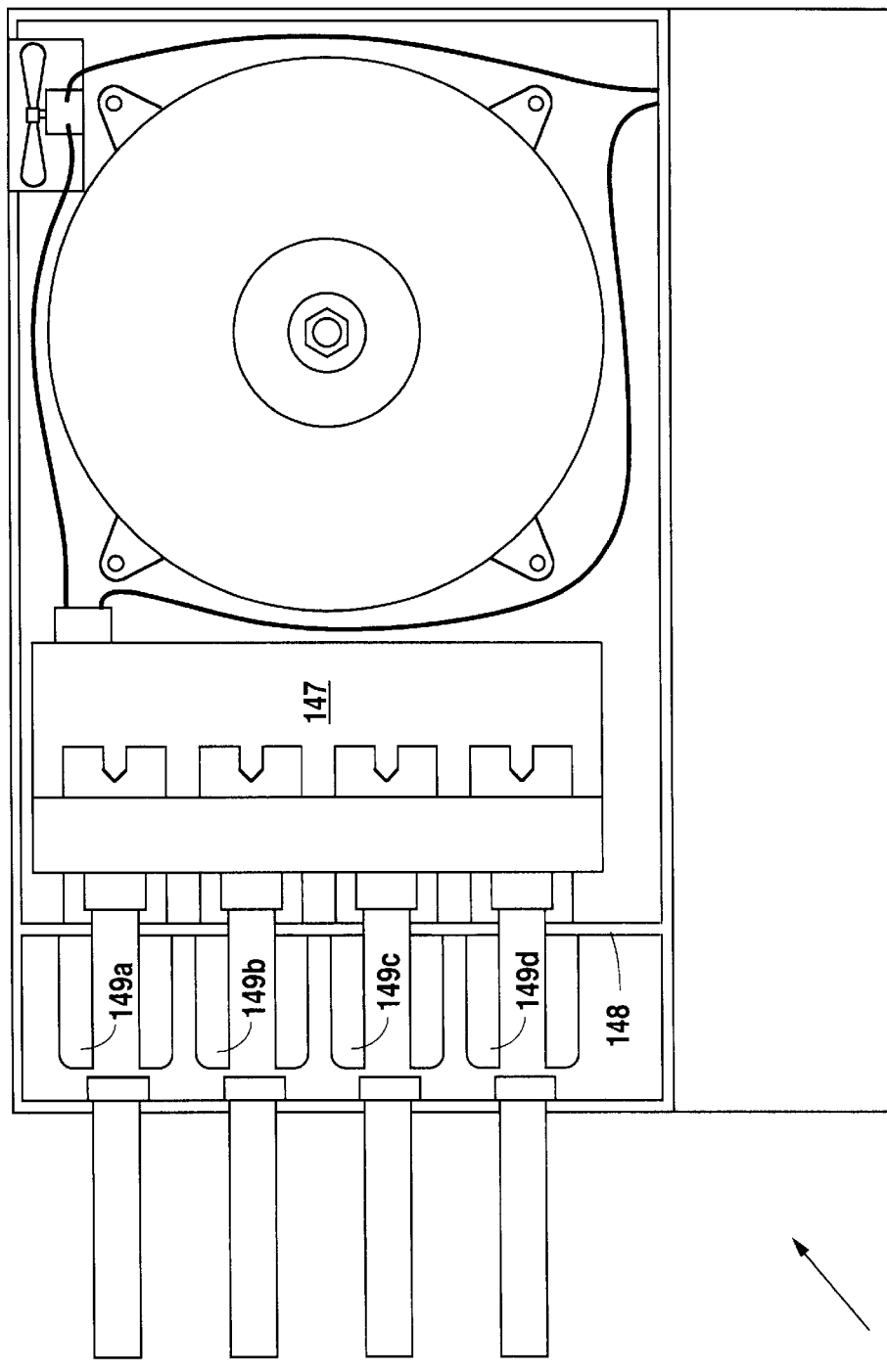
FIGS. 9, 10, 11, and 12 show details of the bariatric treatment system's blower and valve block assembly 137, including details of the valve control motors 149.
Figure 10:
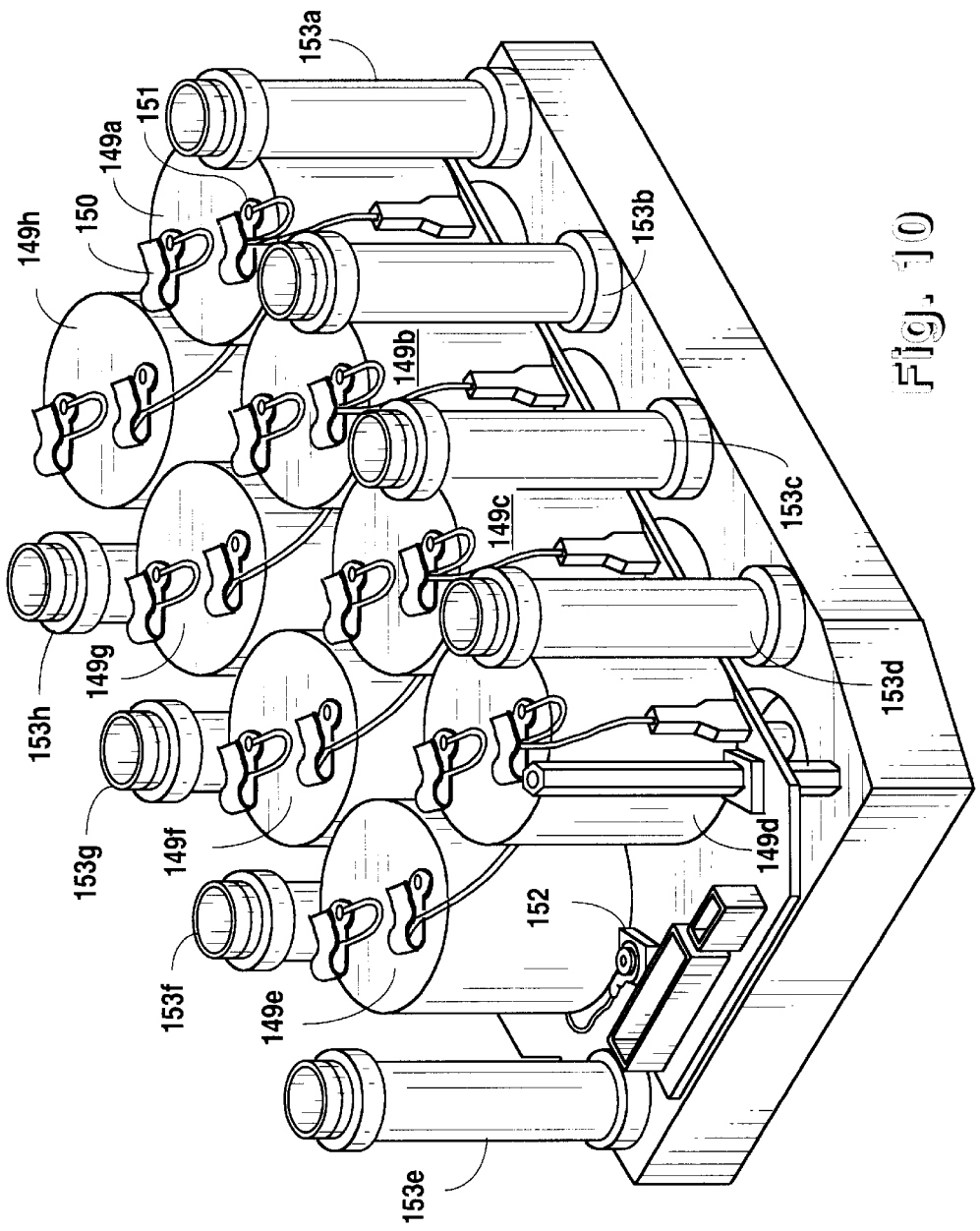
Figure 11:
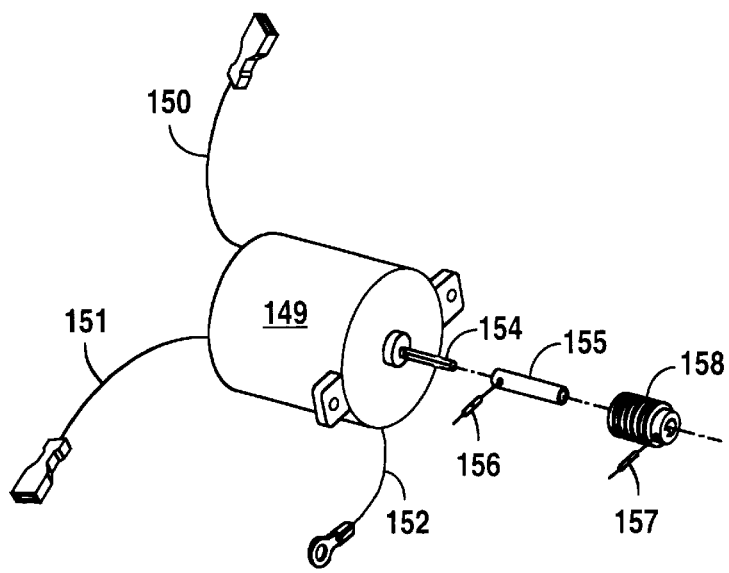
Figure 12:
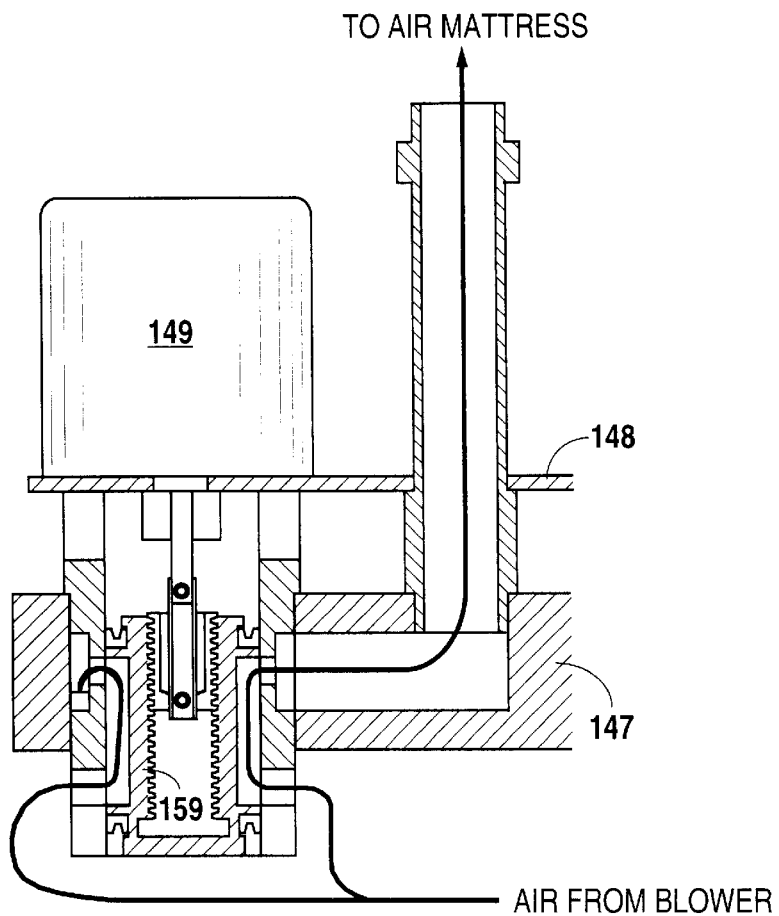
Figure 13:
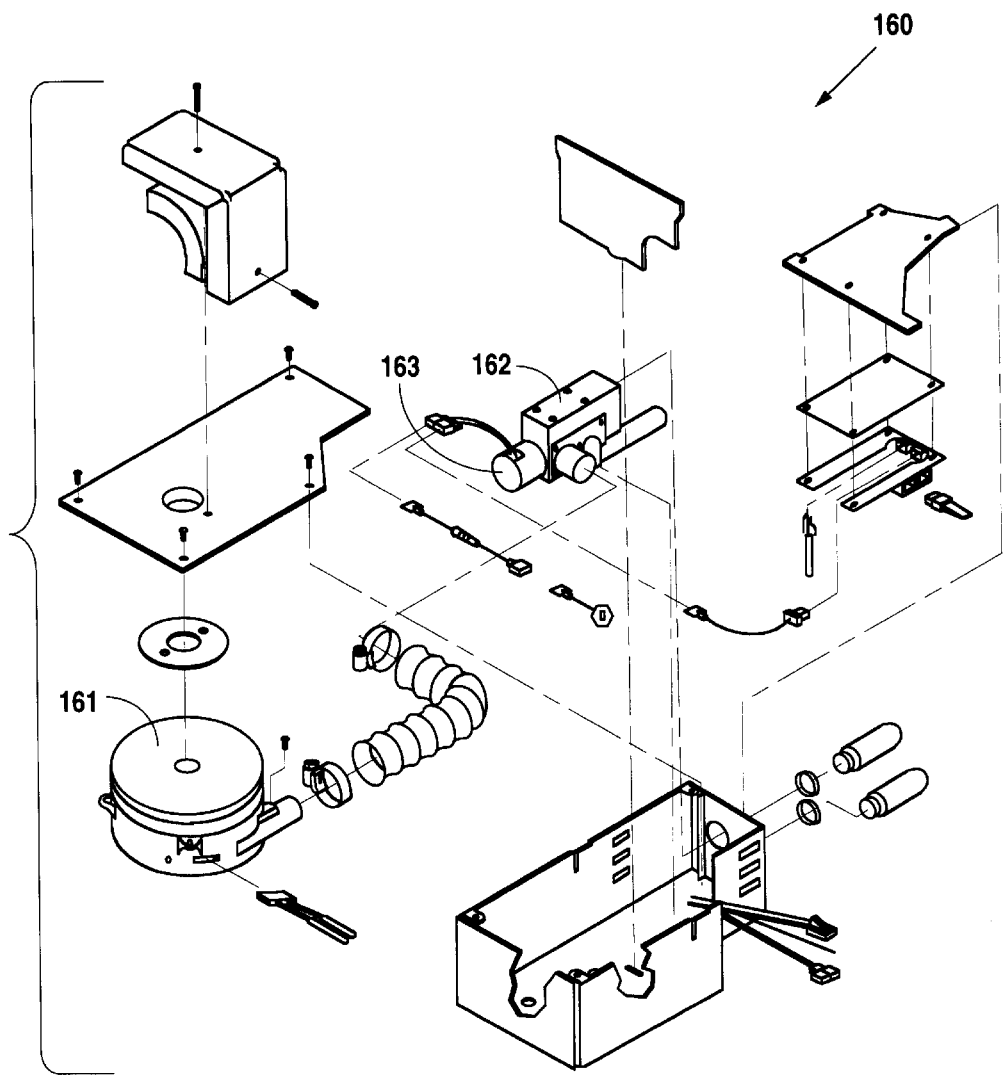
FIGS. 13 and 14 show details of the bariatric treatment system's percussor assemblies 160.
Figure 14:
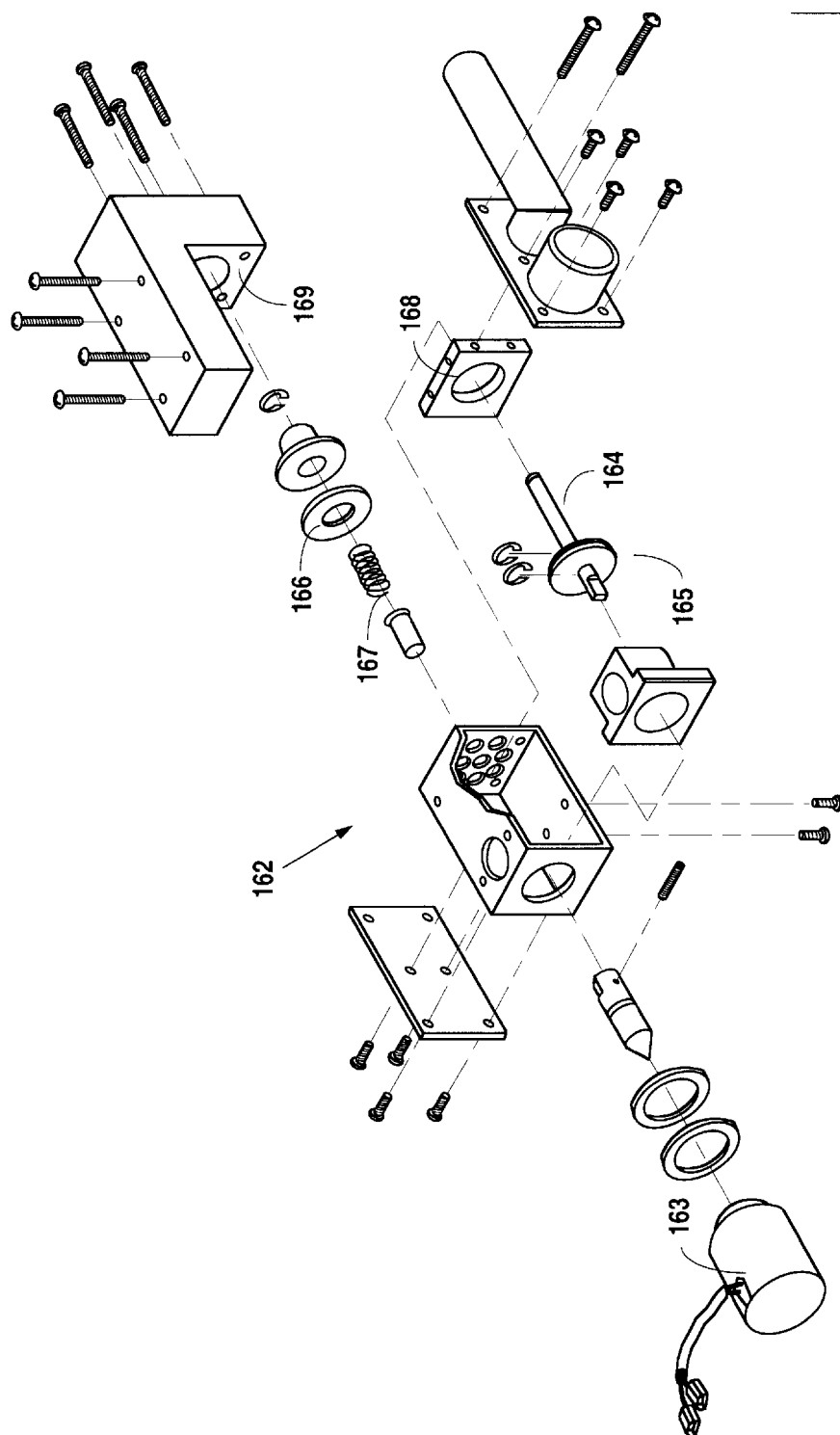
Figure 15A:
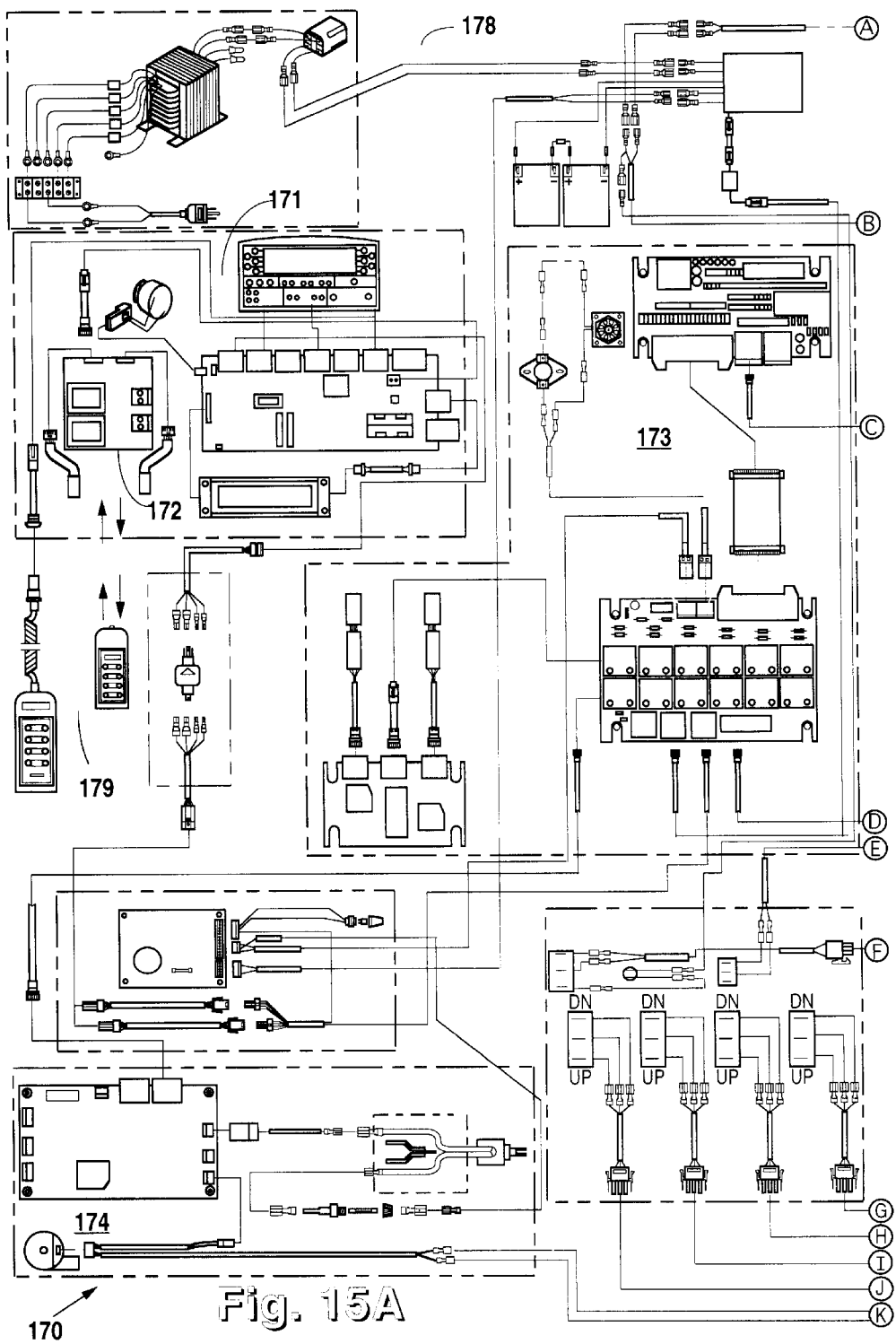
FIGS. 15A and 15B show a schematic overview of the hardware and software control system 170 of the bariatric treatment system 100.
Figure 15B:
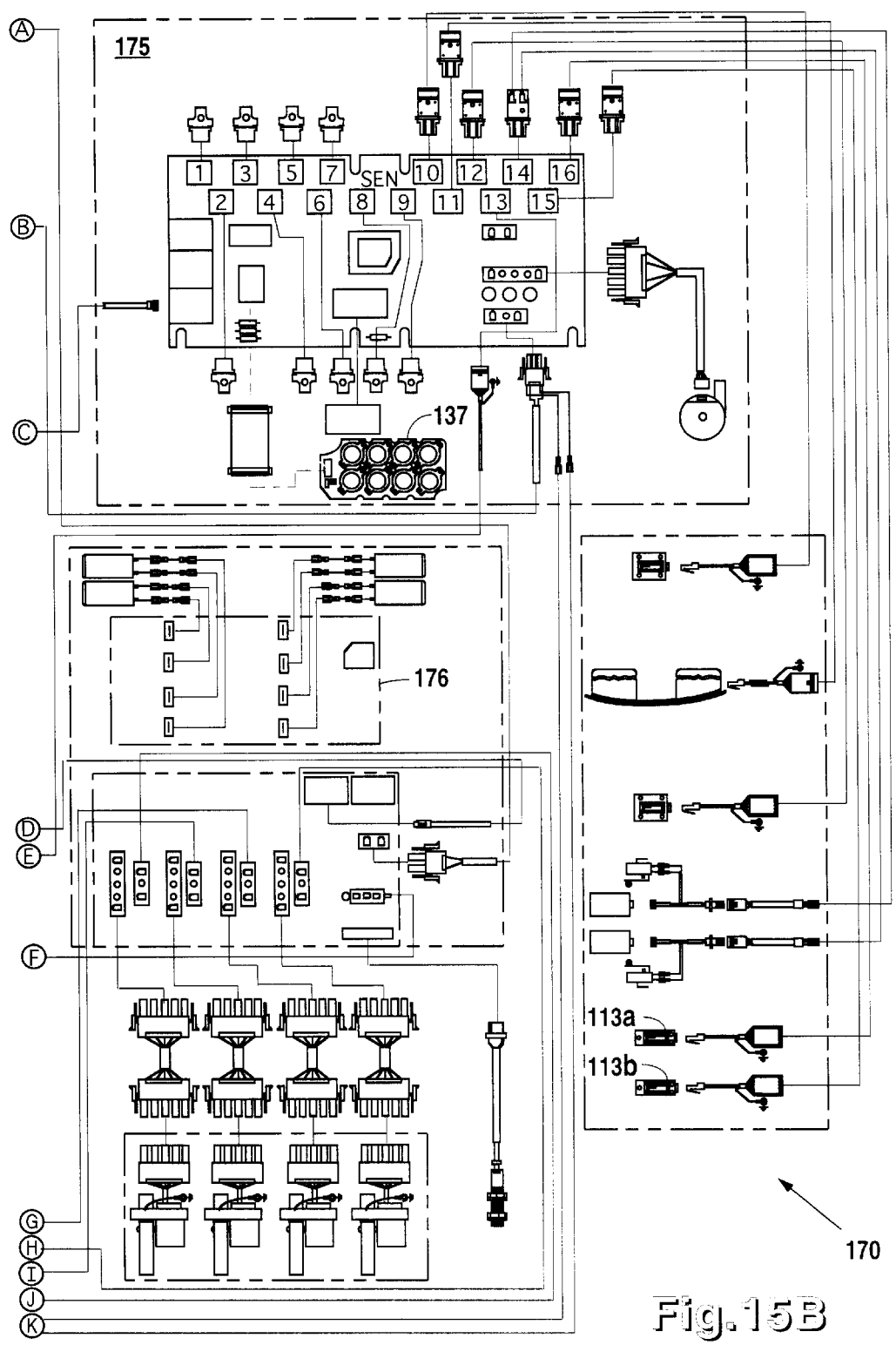
Figure 16A:
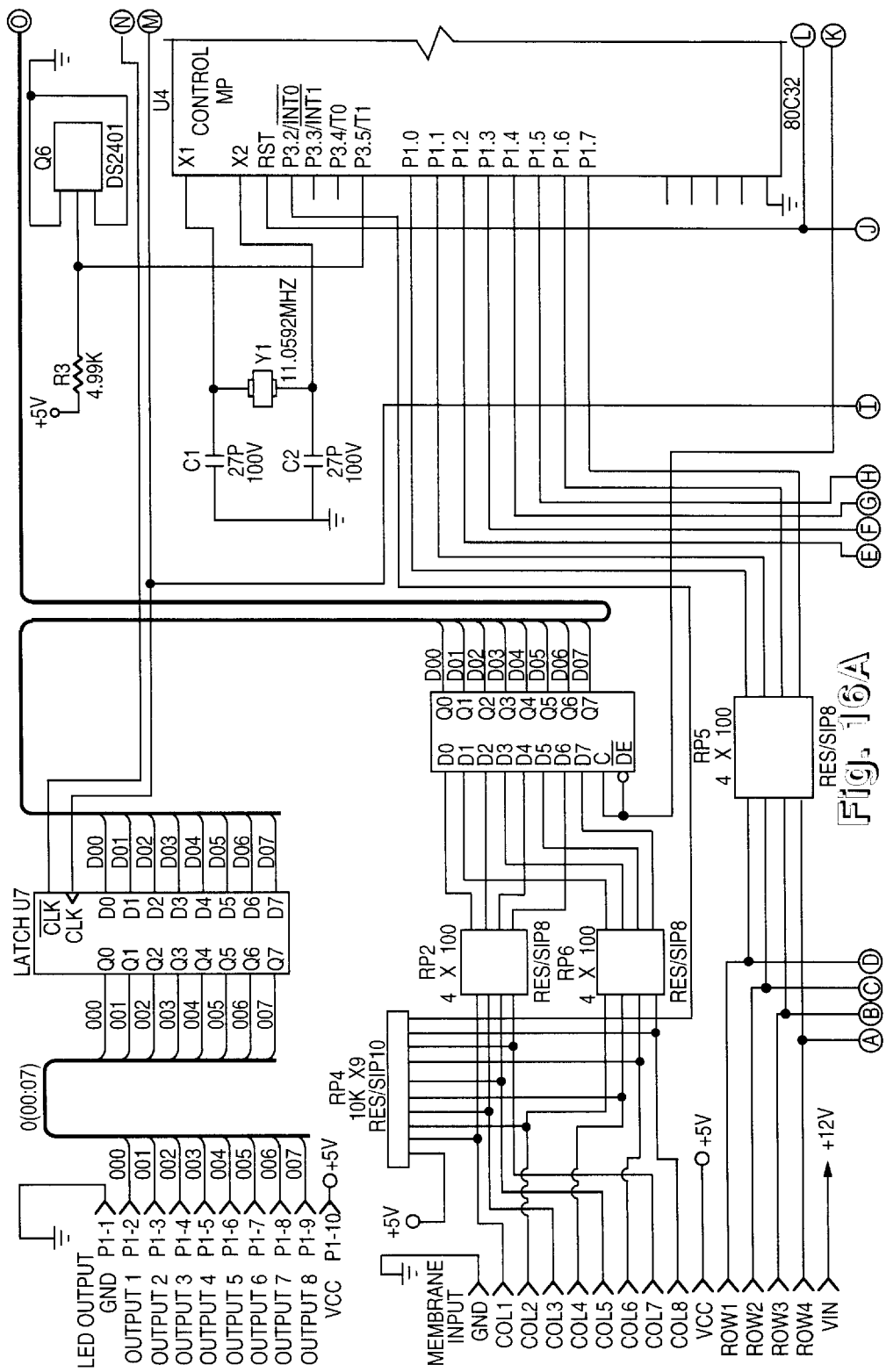
Figure 16B:
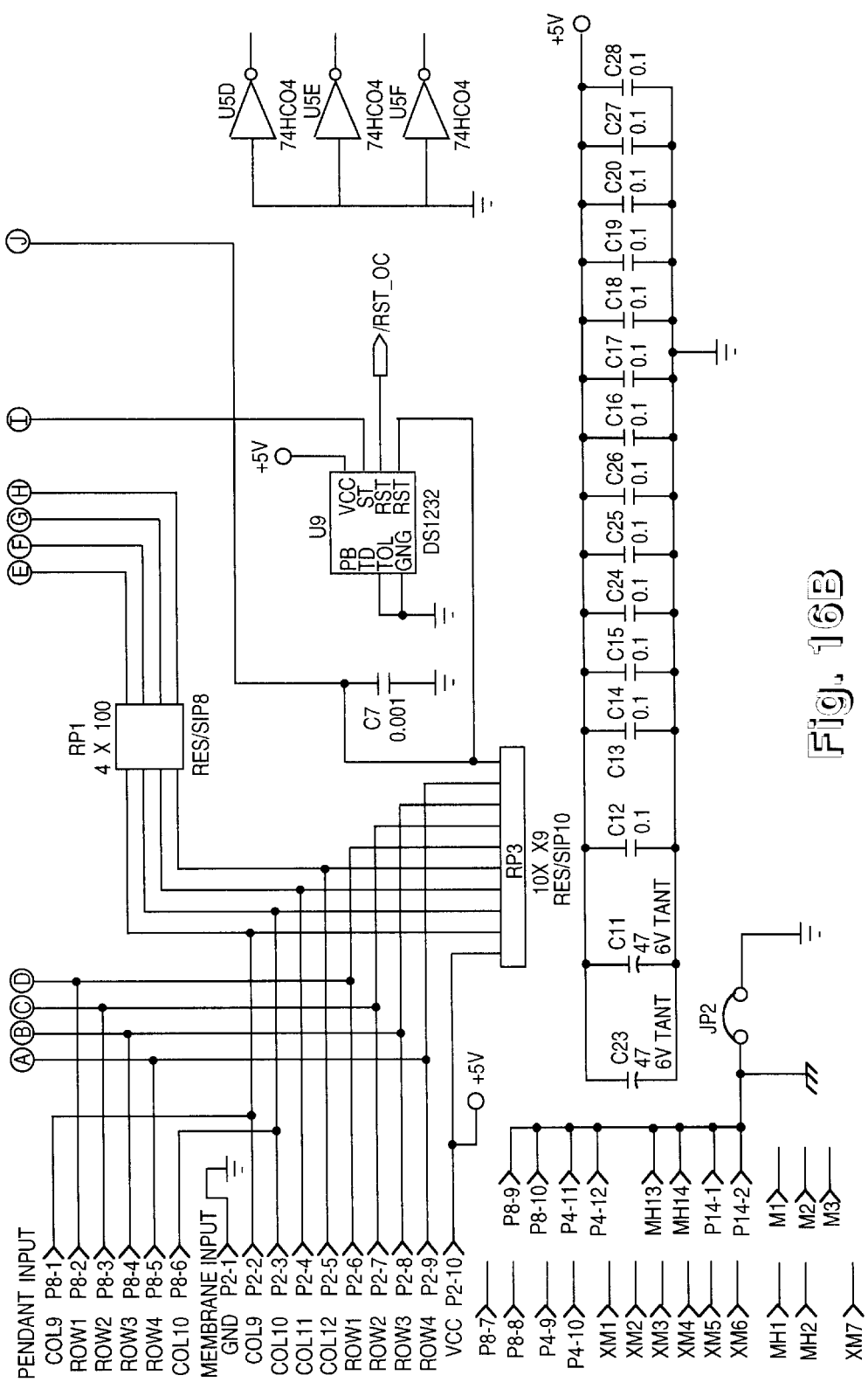
Figure 16D:
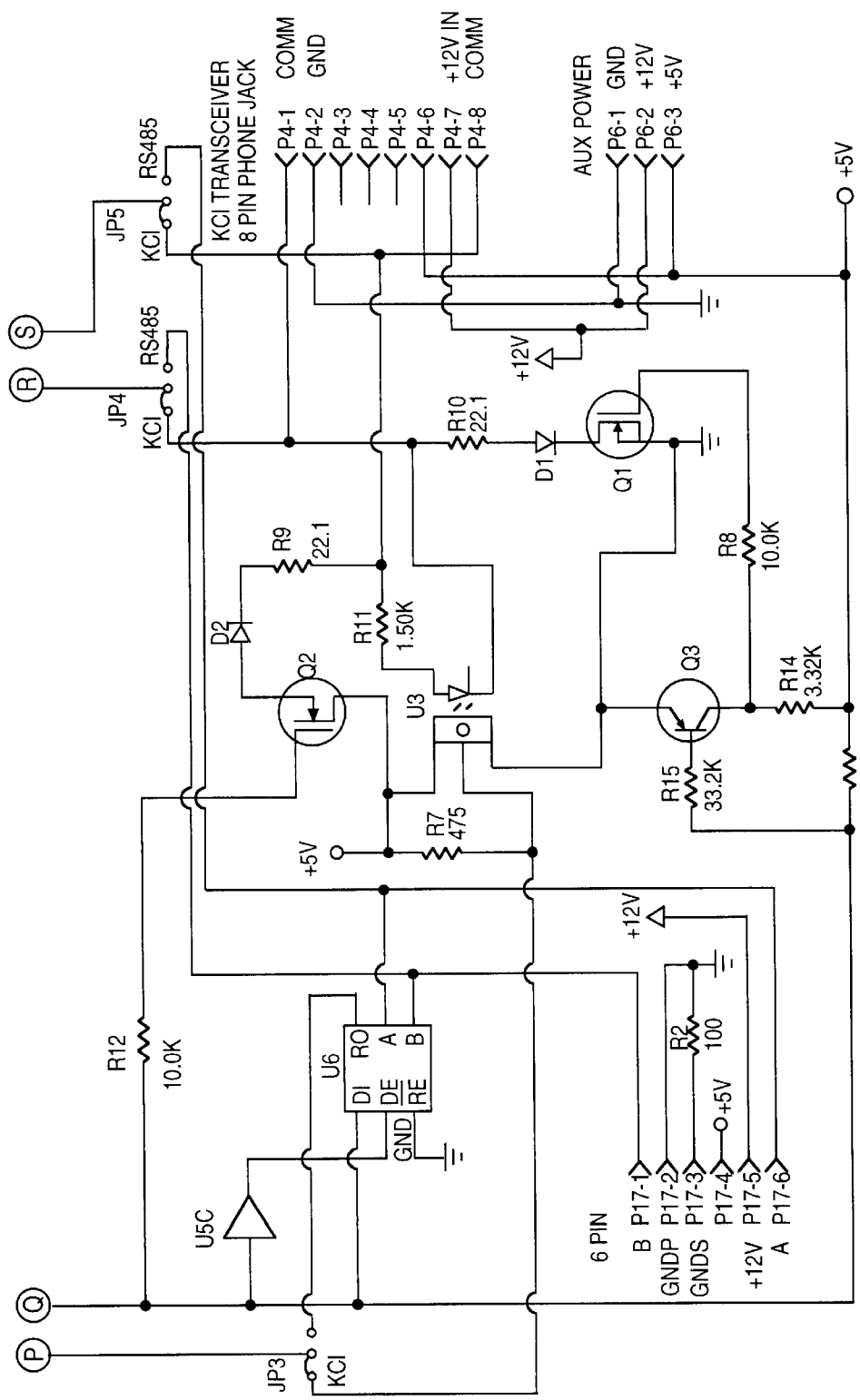
Figure 17A:
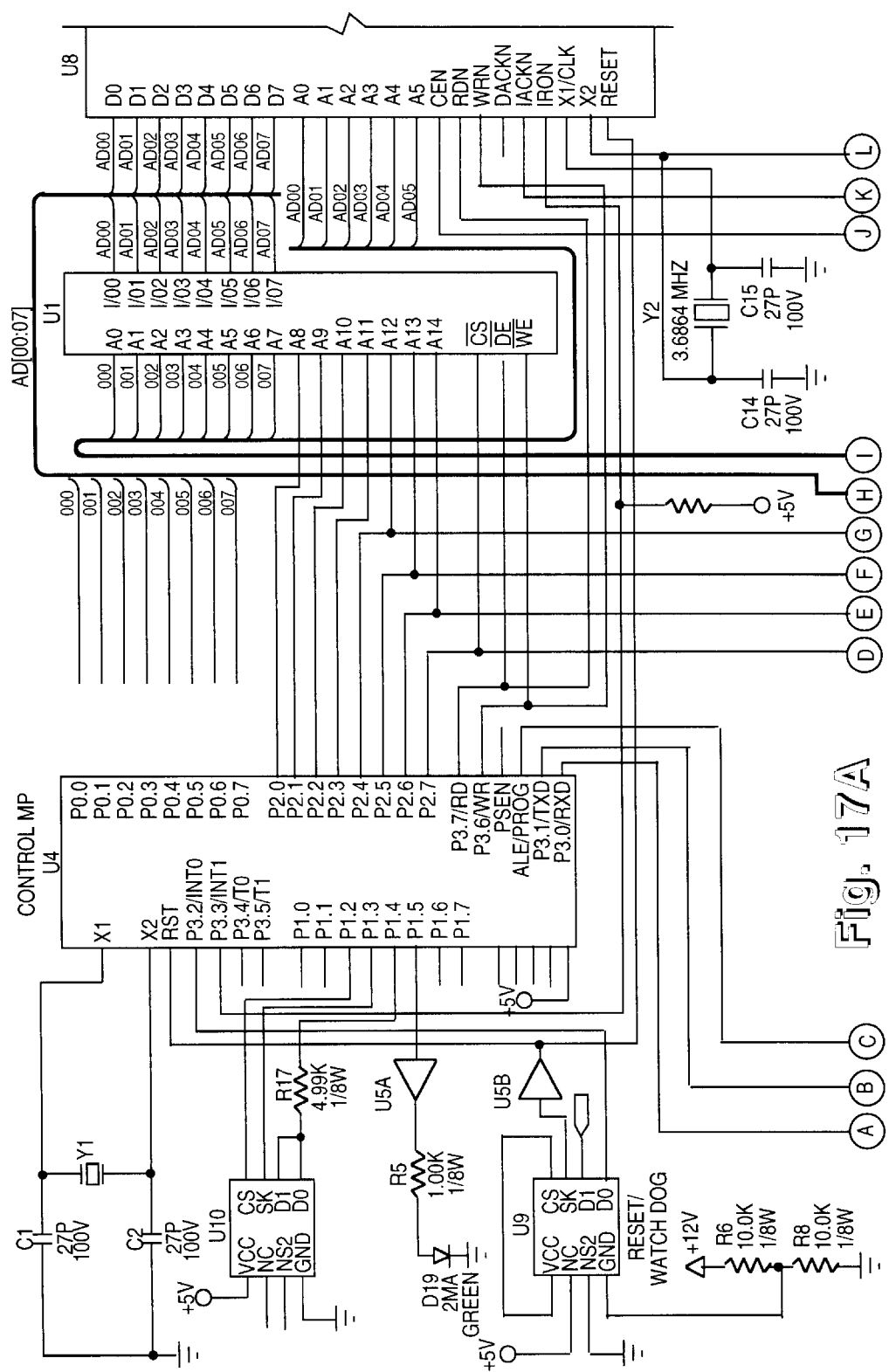
Figure 17B:
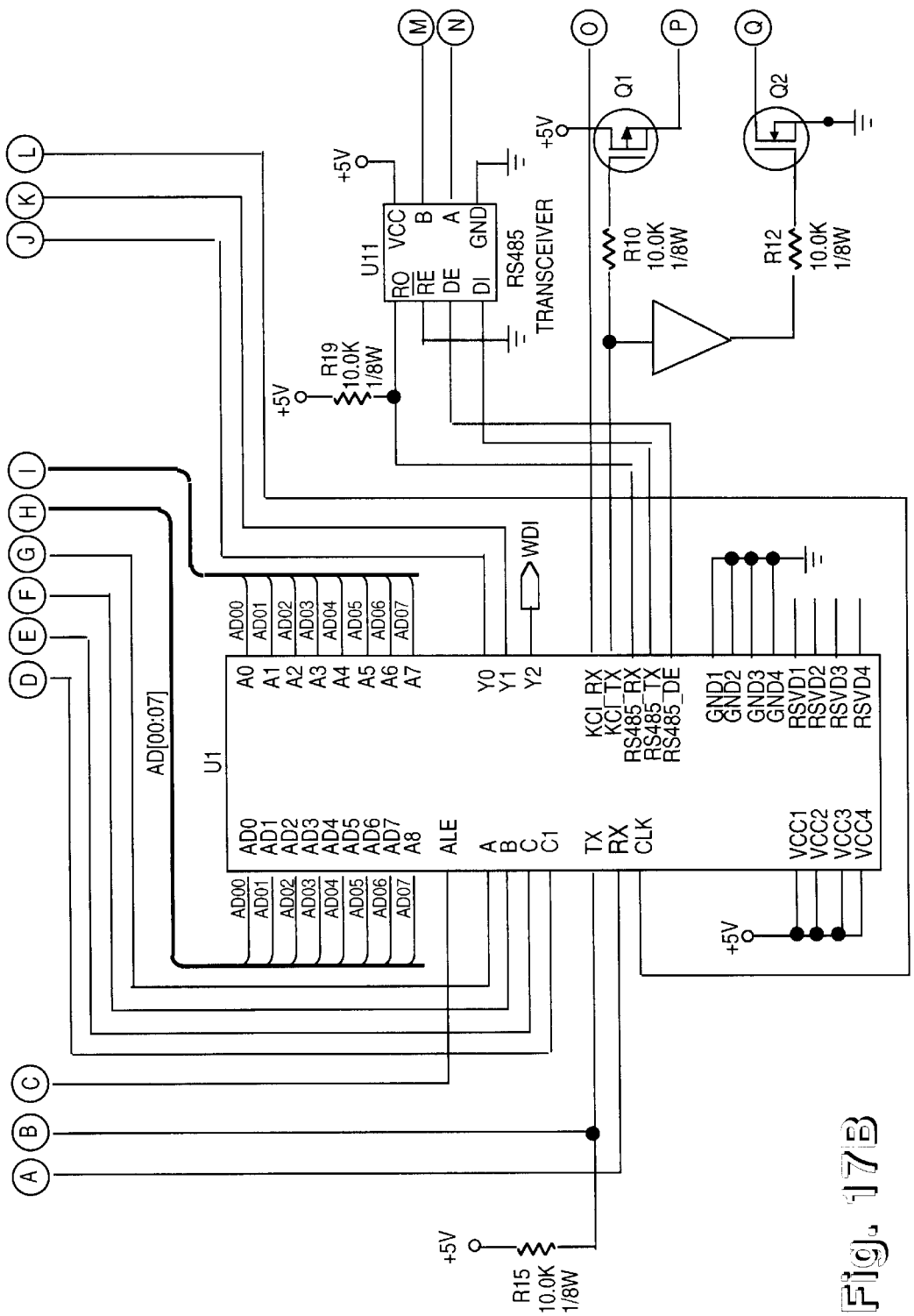
Figure 17C:
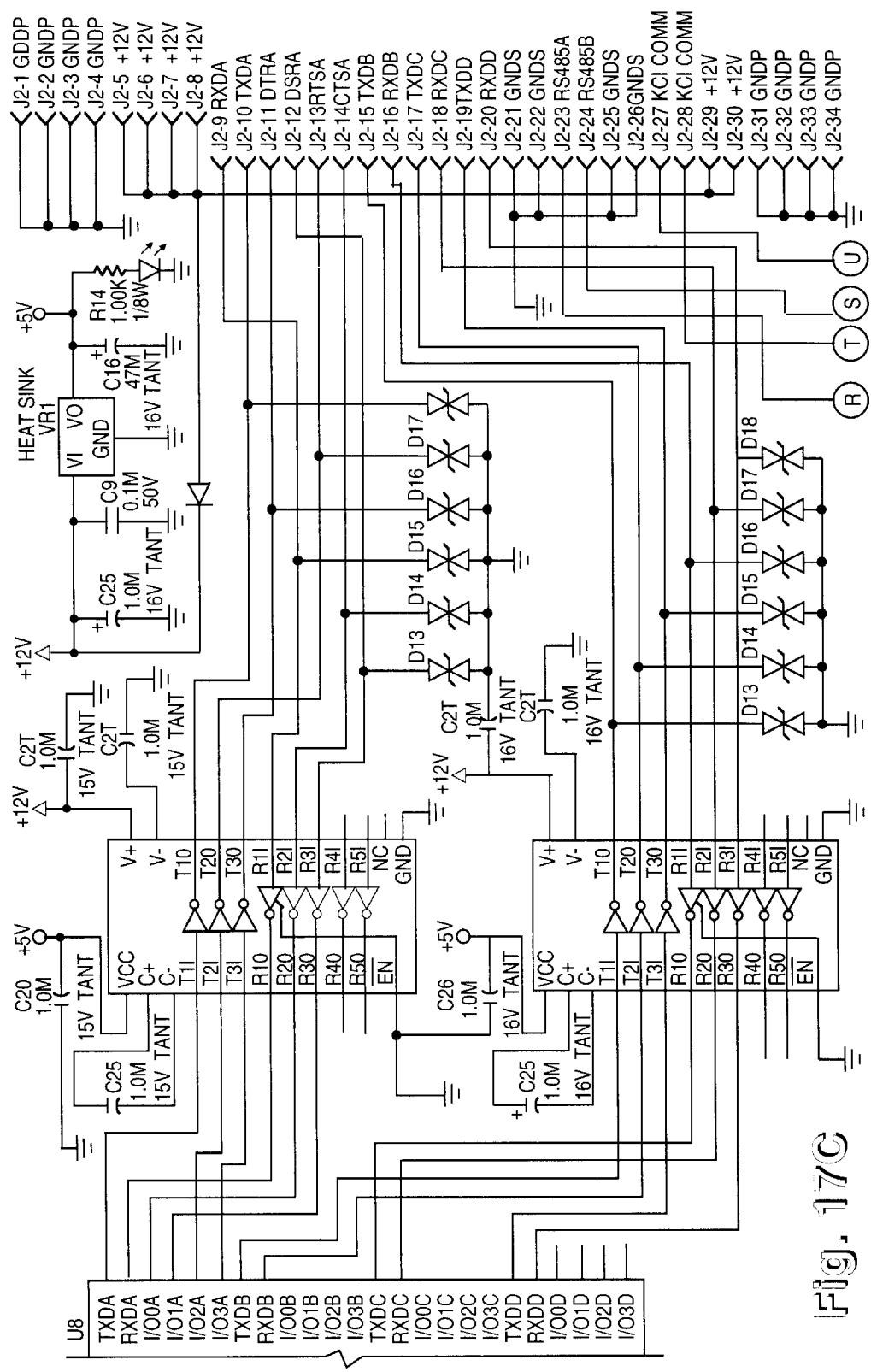
Figure 17D:
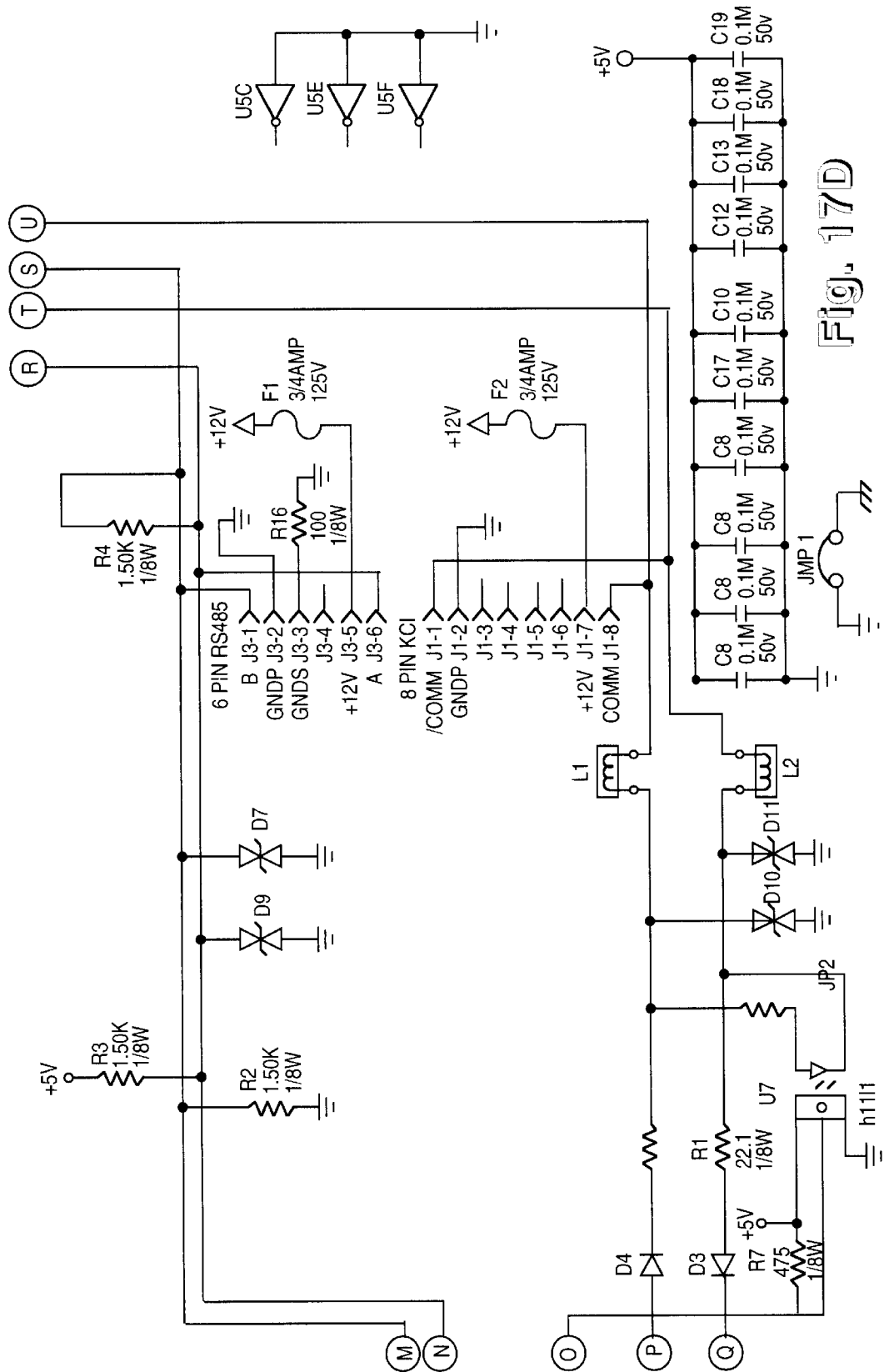
Figure 17E:
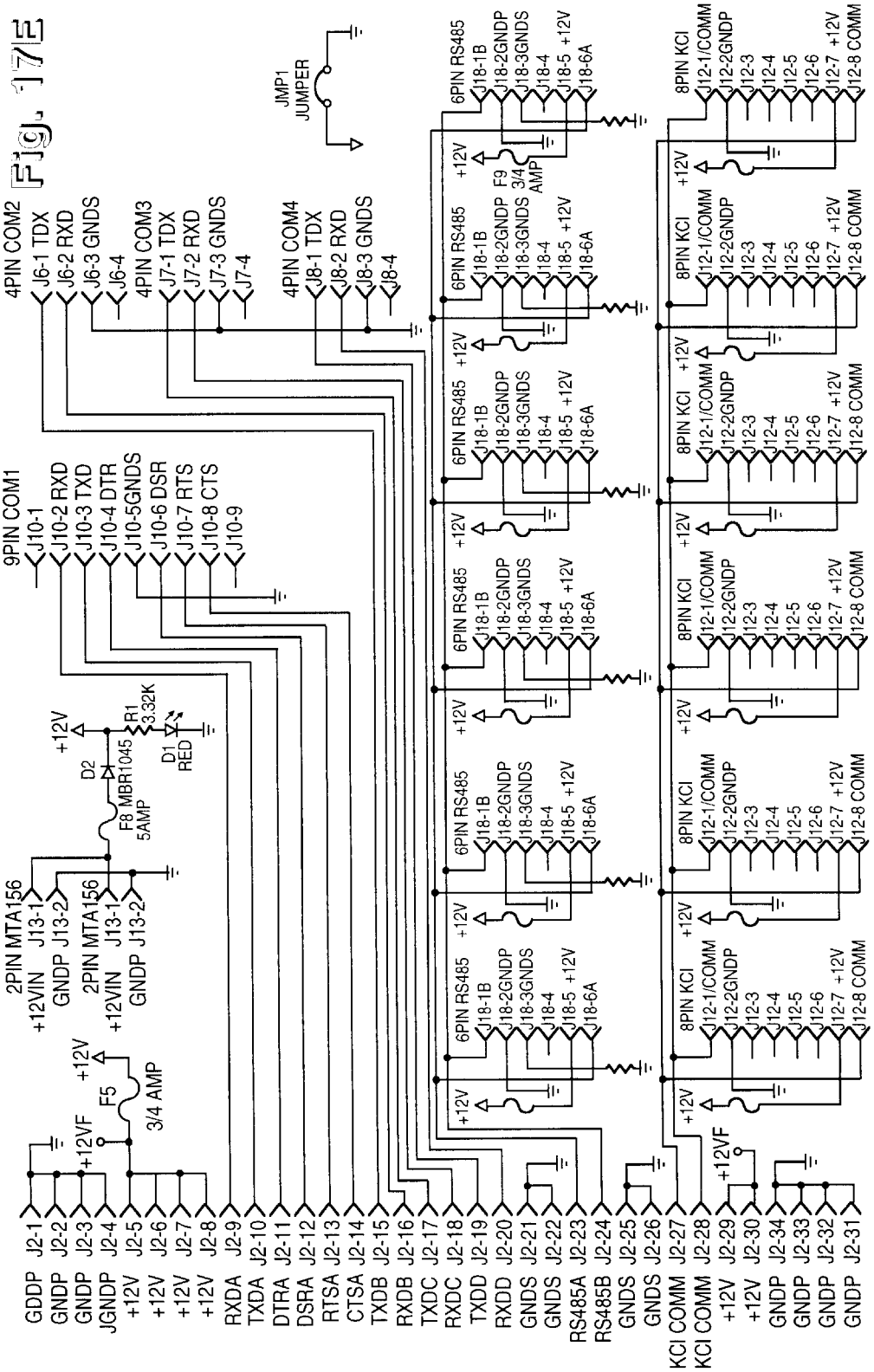
Figure 18A:
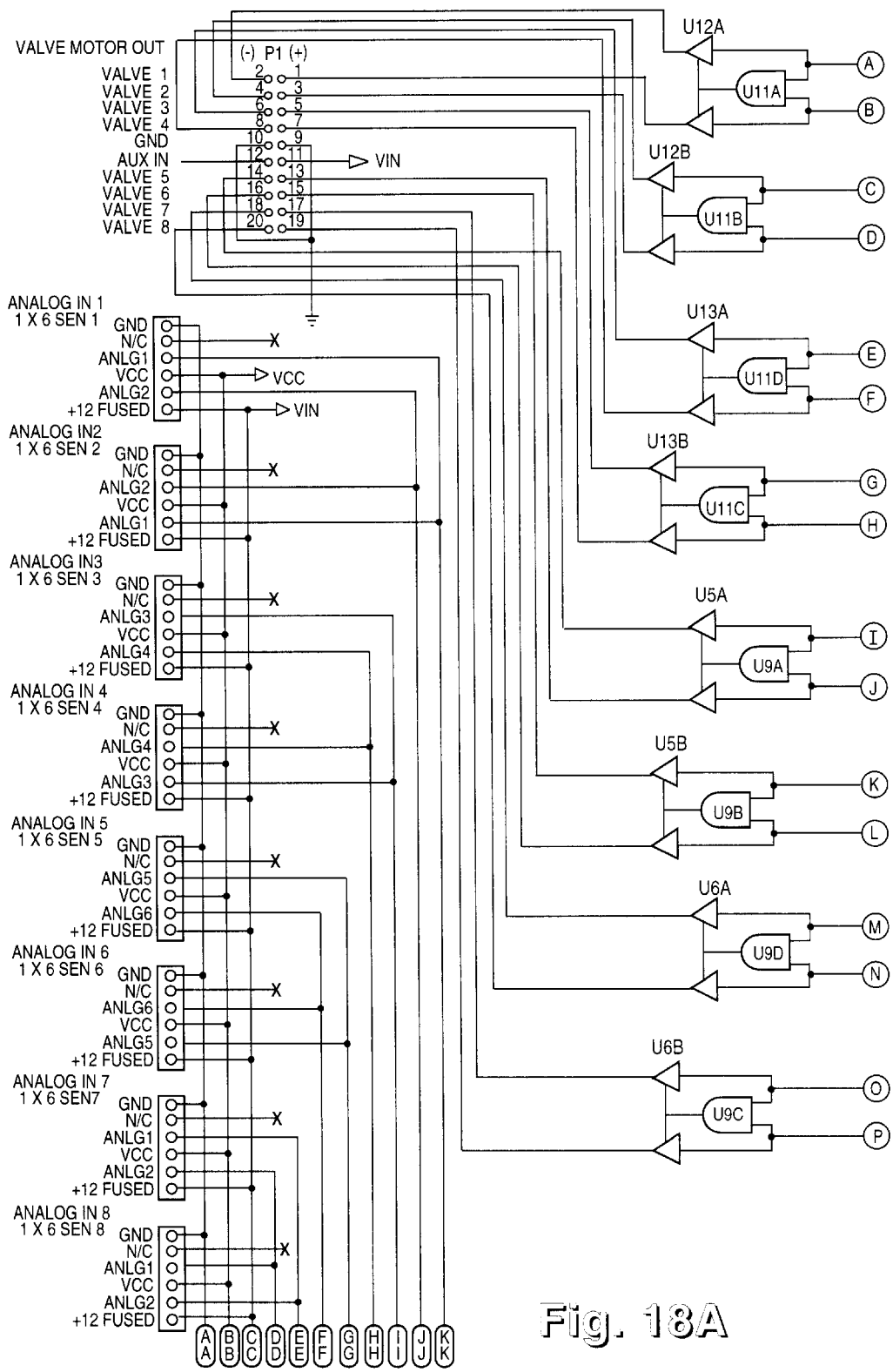
Figure 18B:
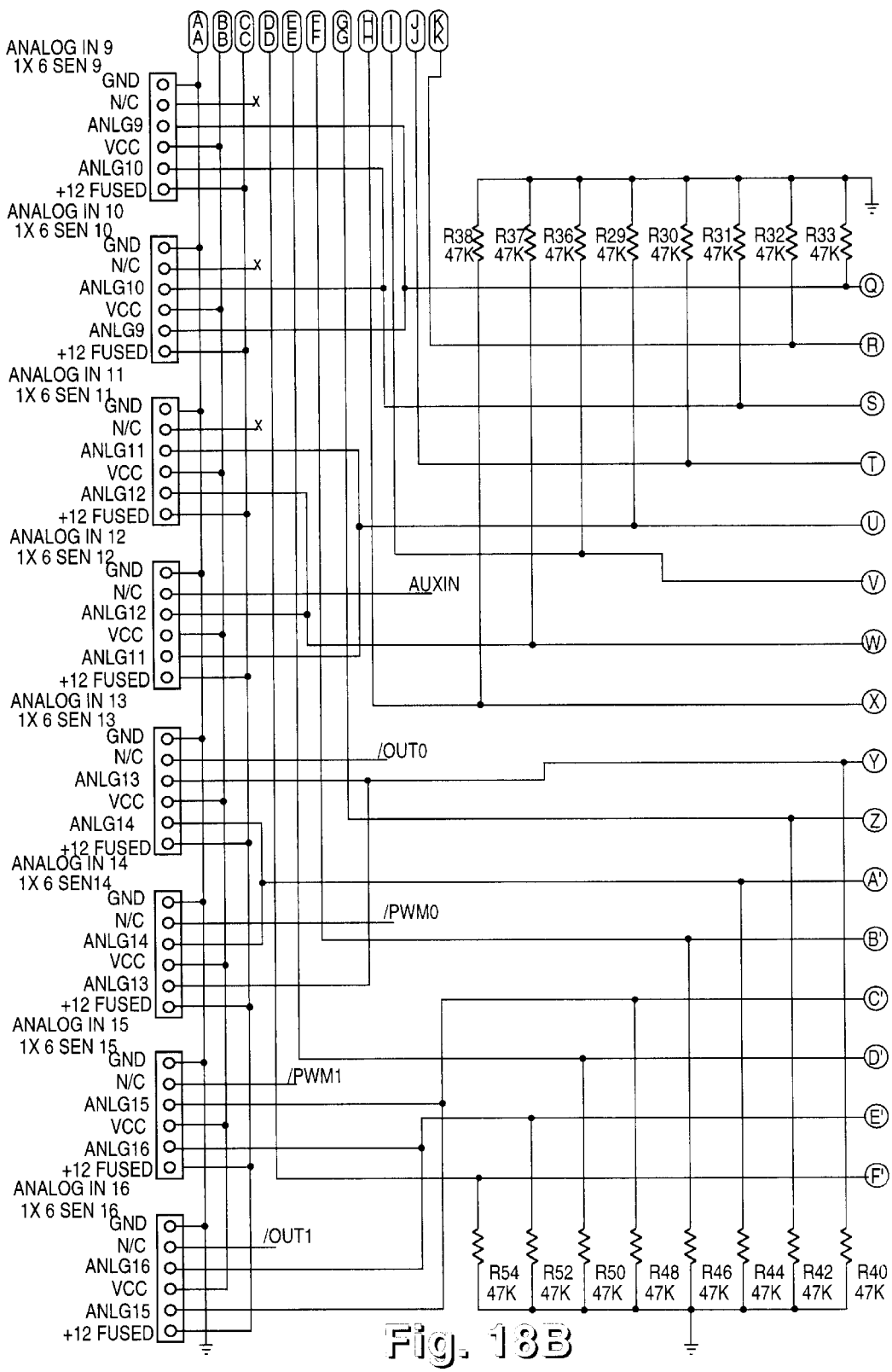
Figure 18C:
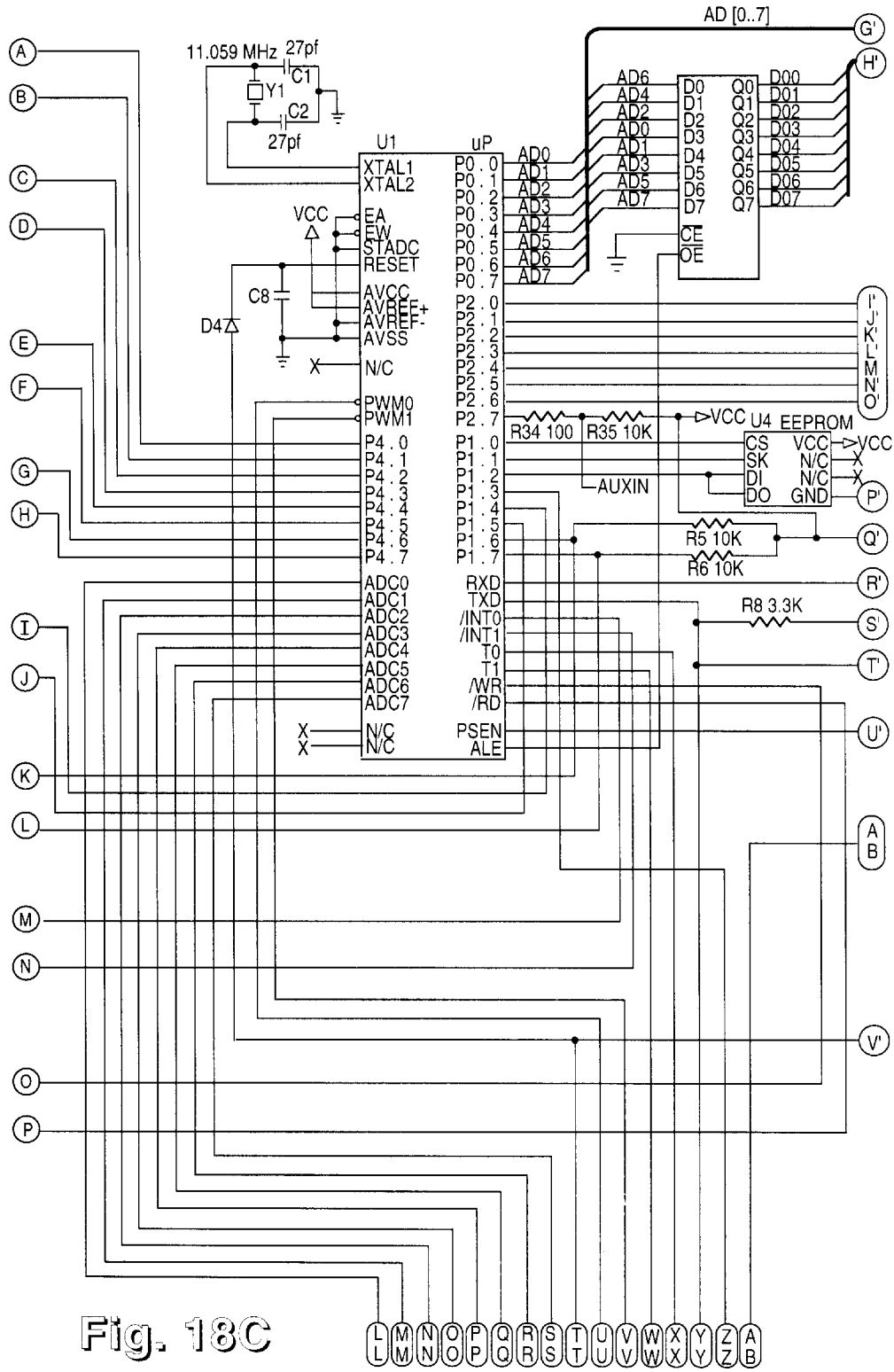
Figure 18D:
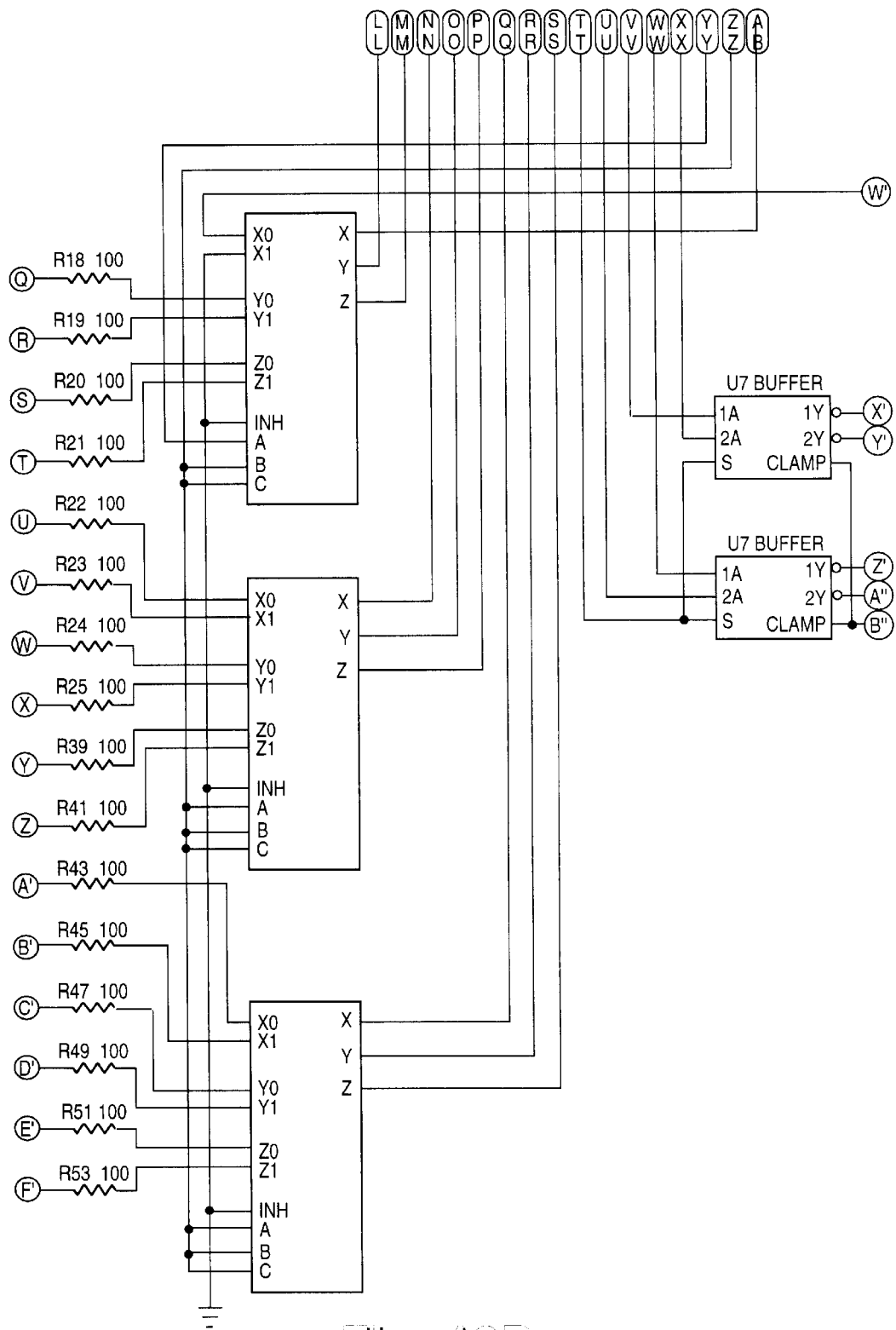
Figure 18E:
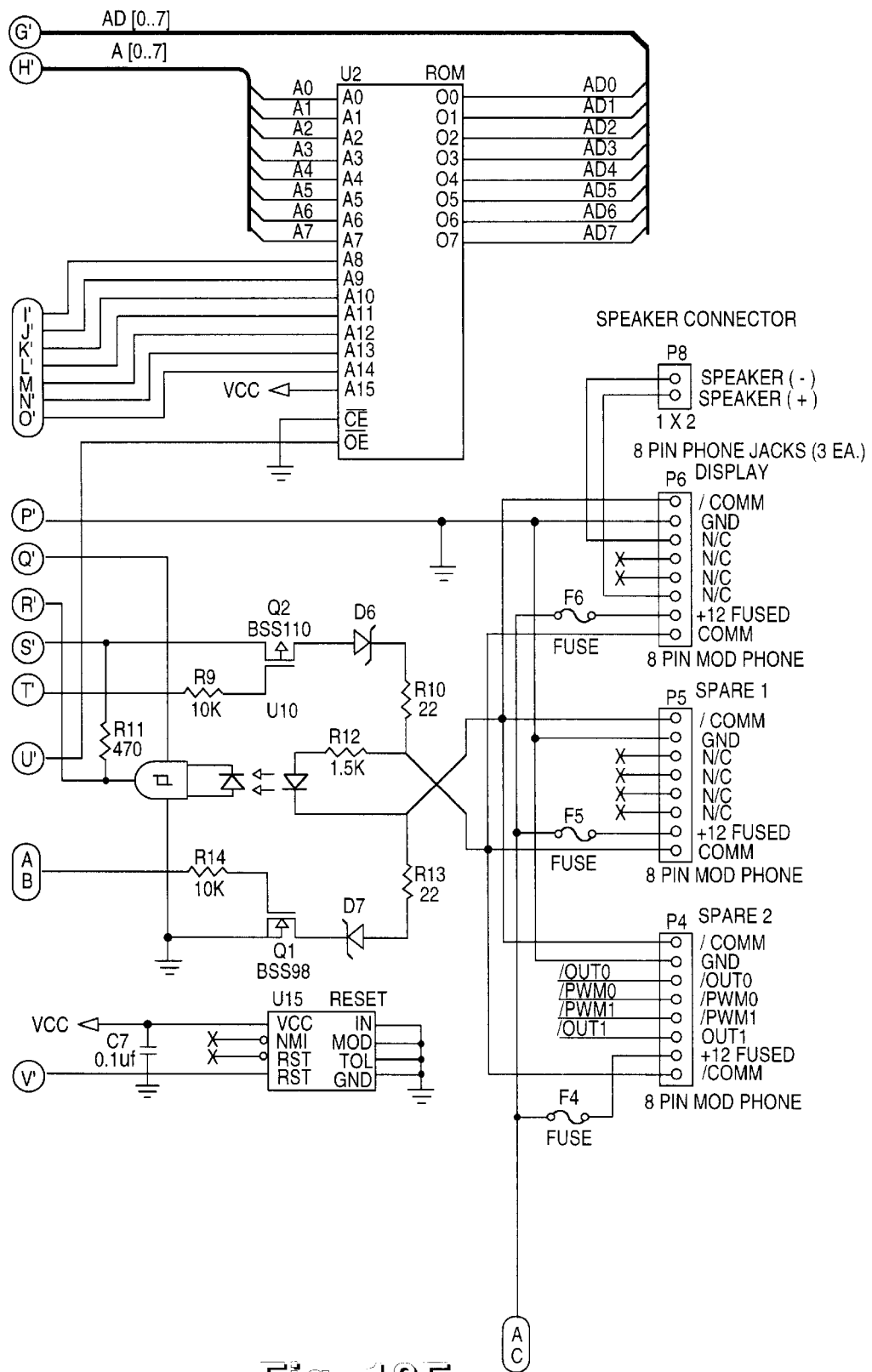
Figure 18F:
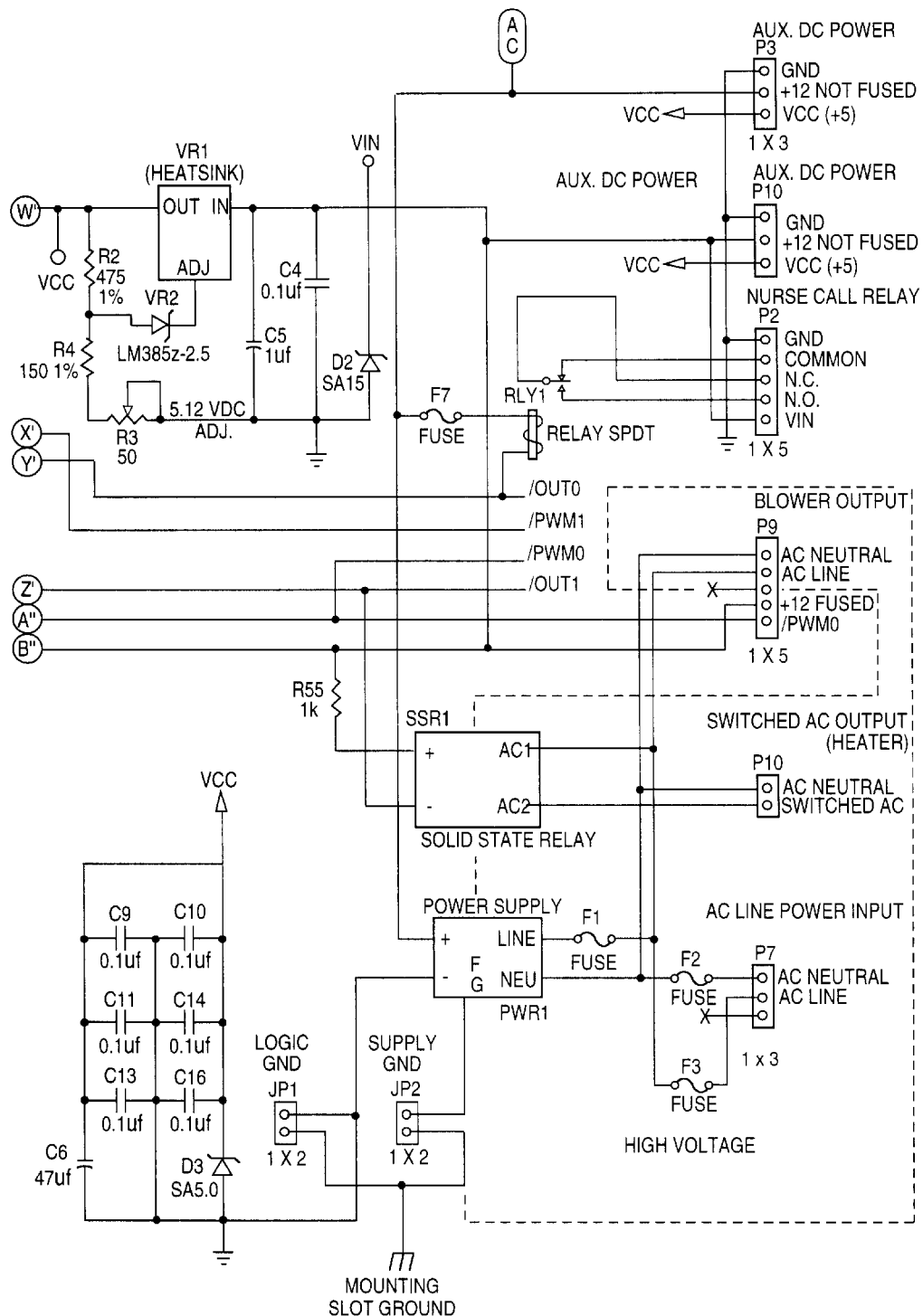
Figure 19A:
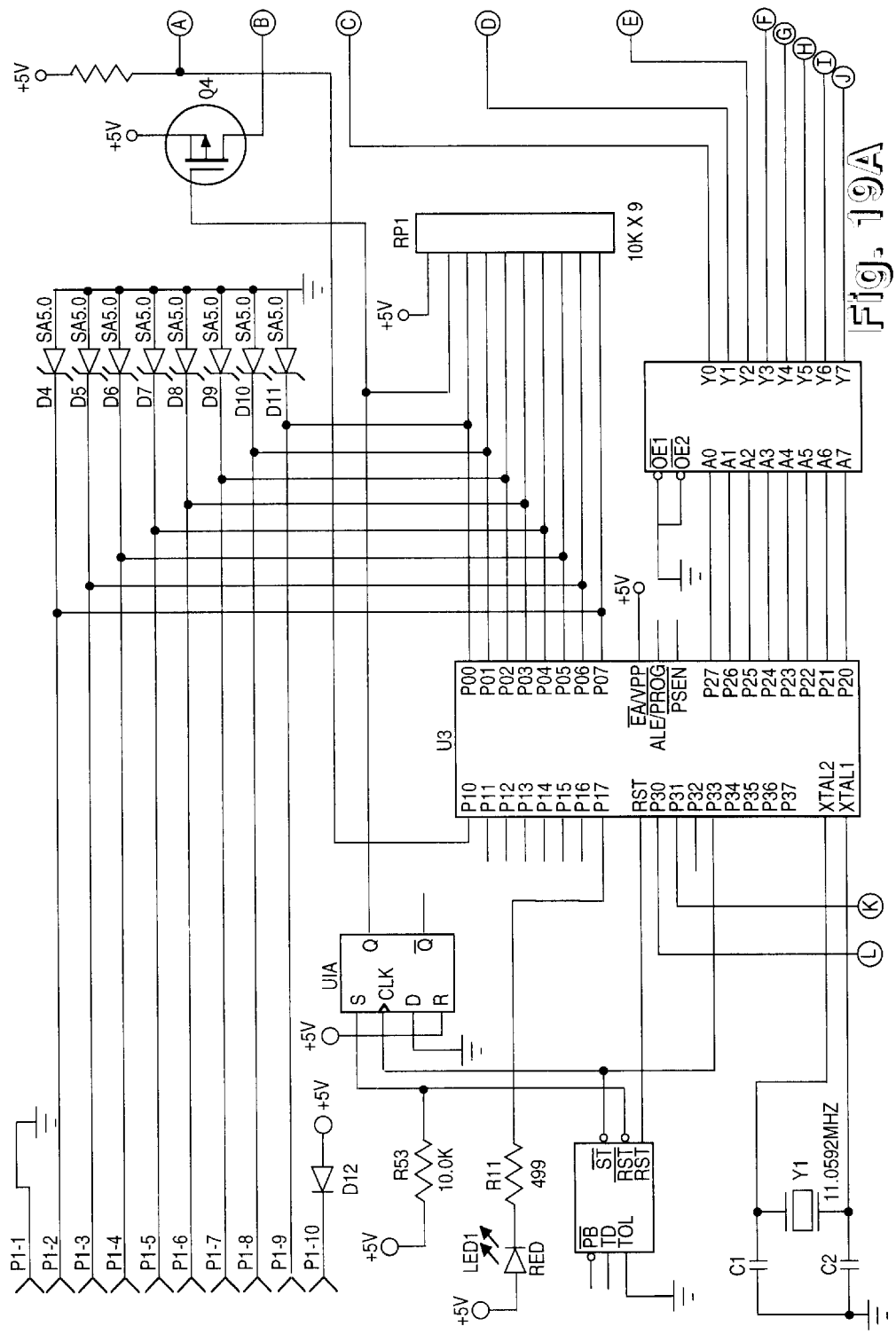
Figure 19B:
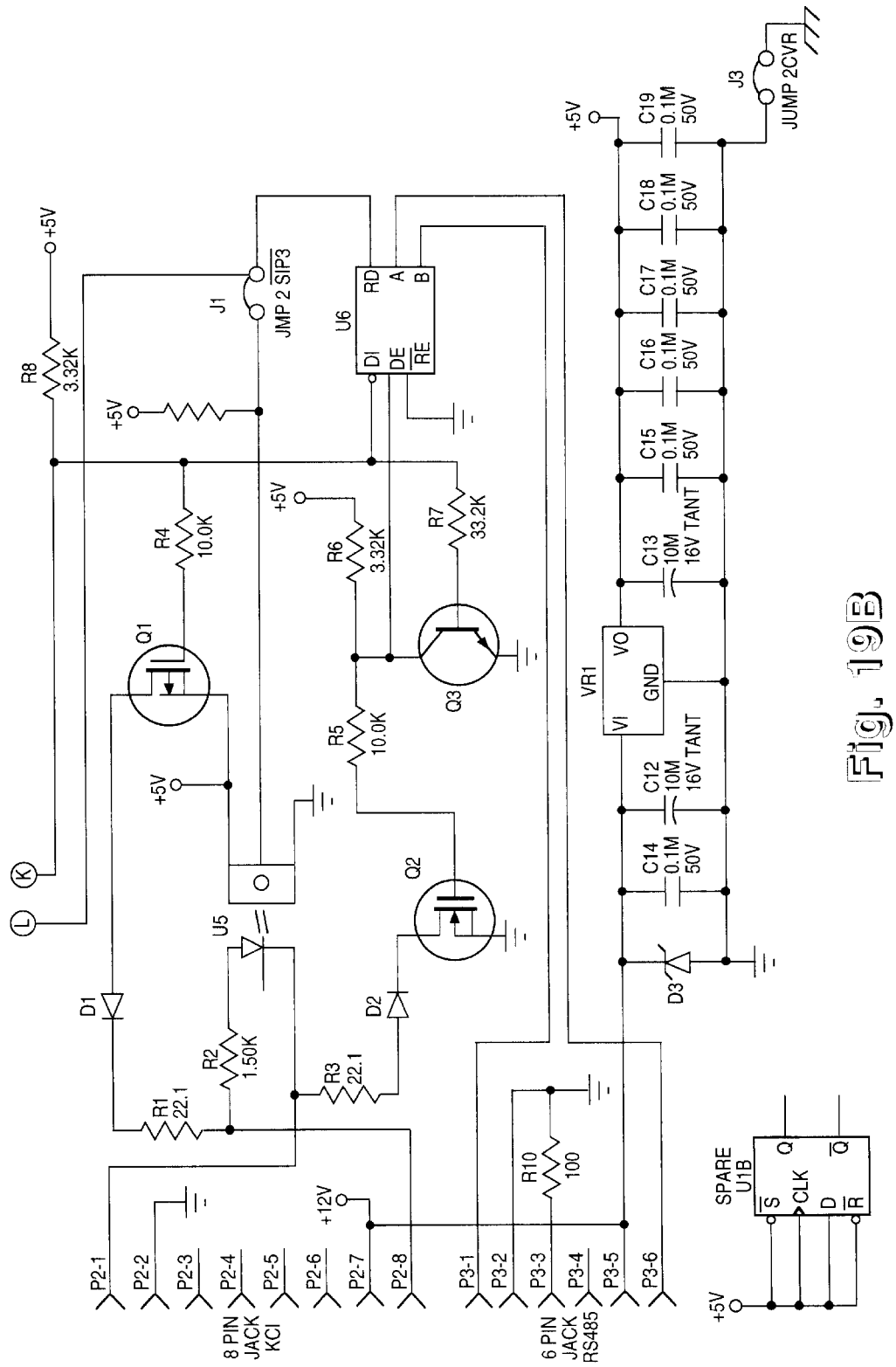
Figure 19C:
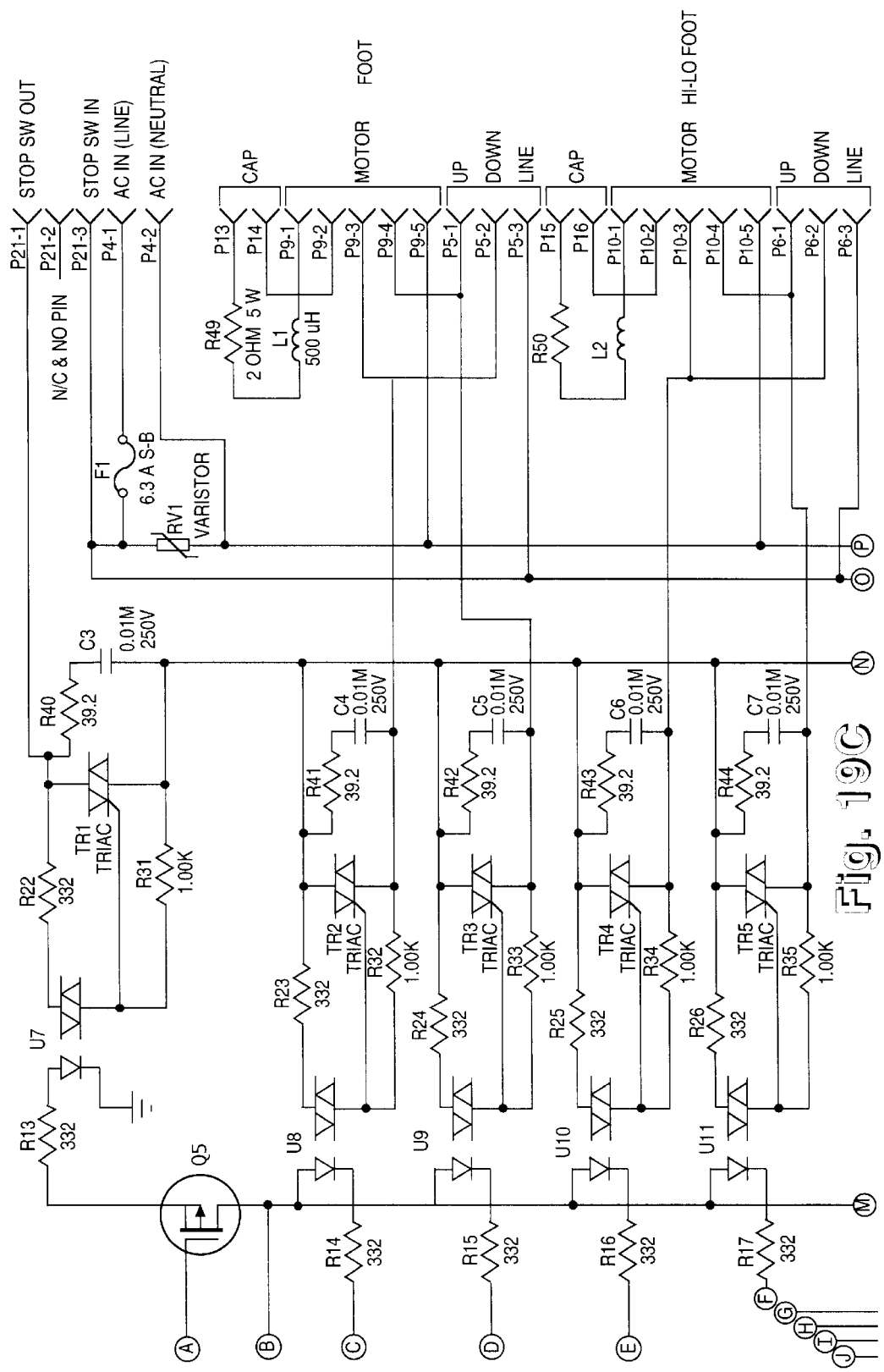
Figure 19D:
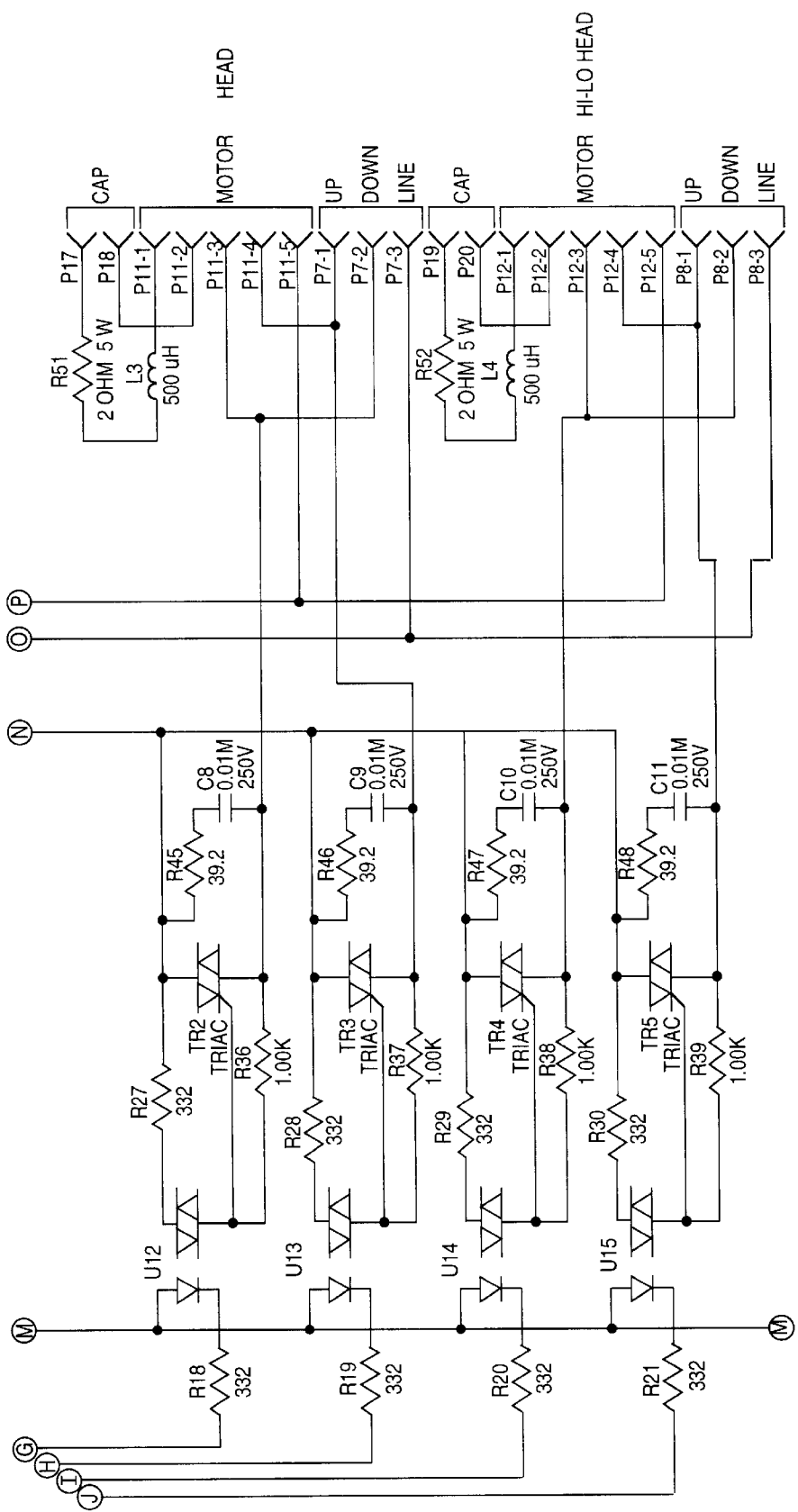

In the preferred embodiment, full extension of the head jack sleeve in order to provide full HEAD UP and simultaneous full retraction of the legs jack sleeve in order to provide full LEGS DOWN causes conversion of the bariatric treatment system bed into a bariatric treatment system reclining chair, as depicted by FIG. 5. In combination with unique benefits provided by the leg and foot board assemblies, as well as by the therapeutic mattress system, detailed further herein, the chair position of the bariatric treatment system is particularly suited toward facilitation of entrance or exit of the bed by a bariatric patient. It should also be noted that the seat assembly provides a convenient mounting location for patient restraint system weldments, as are known by those of ordinary skill in the art and may or may not be desired depending upon the specific application.

The foot board assembly 115 is dependently attached to the leg assembly 103c. The leg assembly 103c generally comprises a leg plate as reinforced by an "I" shaped weldment. This weldment comprises a plurality of attachment points, the purpose of which will be evident herein. The foot board assembly generally comprises a foot plate, a plurality of hinges, cushions and a heavy duty fabric cover. The cover, in the preferred embodiment, is "Dartex P109," commercially available from Penn-Nyla of Nottingham, England.

In the preferred embodiment of the present invention 100, the foam used for the foot plate lower cushion is a antimicrobial open-cell polyurethane foam having a relatively large density of 2.7 pounds per cubic foot and 70 pounds compression. The foam used for the foot plate upper cushion is a similar antimicrobial open-cell polyurethane, but is less dense than the lower cushion, having a density of 2.0 pounds per cubic foot and 41 pounds compression. Both cushions are wedge-shaped, with their greater thicknesses (roughly 1.75 inches and 0.5 inch, respectively) being distal to the hinge. The relative characteristics of these foam cushions serve their varied purposes.

It is well know in the art of designing and manufacturing bariatric patient treatment beds to provide a means by which the patient can easily enter or exit the bed. The patient foot board assembly 115 now described, including the unique dampening features briefly described in the following, is identical to that fully enabled in U.S. patent application Ser. No. 08/382,150, filed Jan. 31, 1995, hereinabove incorporated by reference. Bariatric patients are often not able to hop or step down even short distances without injury or loss of balance. It is therefore desirable to provide a means for entrance or exit which lifts the patient into the bed and similarly sets the patient's feet very near the floor when exiting the bed. In the prior art, it has been shown that a rigid foot board in combination with a chair position feature, as previously detailed herein, facilitates bariatric patient care. However, measures are taken to ensure such foot boards are not used as a step when exiting the bed, presumably for safety reasons in view of the excessive weight of bariatric patients. The present invention goes against such teachings by providing a foot board which is adapted to be used safely as a step for bariatric patients.

The foot board assembly 115 attaches to the leg assembly 103c by such means as to provide gradual increase in rigidity as weight is applied to the foot cushion 116, so as to provide adequate support of the bariatric patient entering or exiting bed yet avoiding fixed resistance to a sudden increase in force. The primary attachment of the foot board assembly to the leg assembly is by a hinge through weldments on the foot board assembly and a plurality of holes in a weldment of the leg assembly. Articulation about this hinge is constrained by dampening cylinders and a spring, as detailed further herein. The spring, in compression, attaches to the leg assembly weldment by a pin, itself affixed by a cotter pin. The spring attaches to the foot board assembly weldment also by a pin, itself affixed by another cotter pin. A hydraulic cylinder, of the type which dampens primarily in compression, attaches to the leg assembly weldment by a pin, itself affixed by a cotter pin. The compression hydraulic cylinder attaches to the foot board assembly weldment also by a pin, itself affixed by another cotter pin. A hydraulic cylinder, of the type which dampens primarily in tension, attaches to the leg assembly weldment by a pin, itself affixed by cotter pin. The tension hydraulic cylinder attaches to the foot board assembly weldment also by a pin, itself affixed by another cotter pin. The particular cylinder selected for compression dampening is, in the preferred embodiment of the present invention, an adjustable cylinder having a two-inch stroke and available through Enidine of Orchard Park, N.Y., part number (LR)OEM 1.5M×2. The particular cylinder selected for tension dampening is, in the preferred embodiment of the present invention, an adjustable cylinder having a four-inch stroke and also available through Enidine of Orchard Park, N.Y., part number ADA 510T. The particular spring selected is, in the preferred embodiment of the present invention, a medium load, round wire spring available through Lee Spring Company of Brooklyn, N.Y., part number LHL-1 500A-9MW.

Under the weight of a bariatric patient, the compression dampening hydraulic cylinder increasingly resists articulation of the foot board assembly about the attaching hinge. Gradually, resistance will increase as more weight is applied by the patient. In this manner, the foot board assembly is able to provide increasingly rigid support of the bariatric patient while minimizing any risk of snapping under the weight of a typical bariatric patient. Further if a bariatric patient should apply weight onto foot board at excessive speed, the dampening action of the compression dampening hydraulic cylinder may serve to prevent injury to the patient's knees and legs. Once weight is removed from foot board (such as once the patient has completely exited the bed), the spring returns the foot board assembly to its original position with respect to the leg assembly. The tension dampening hydraulic cylinder resists the return motion of the spring. Such dampening helps prevent snapback of the foot board assembly, which might otherwise present safety hazards.

The cushions not only enhance patient comfort but can also cushion engagement of the foot board with the floor as the patient exits or enters the bed. Additionally, in case a caregiver is unalert and places a foot beneath foot board assembly, and a patient's weight does cause the foot board assembly to contact the caregiver's foot, heavy padding of the lower cushion distributes the weight and cushions the caregiver's foot to help prevent excessive discomfort or physical injury.

Pins 134, held in position beneath the foot board assembly by nuts, may be placed in a release position so as to allow the foot plate to articulate about a secondary attachment hinge. Said release allows the patient support foot cushion to lie coplanar with the leg cushion. This may be desirable when the bed surface is in a horizontal position and the caregiver wishes to minimize pressure against the patient's feet.

The left side rail 110a generally comprises a metal frame encased by molded plastic covers 111a. The frame is generally dependently attached to a side rail mounting plate through weldments and shafts, substantially identical those fully enabled in U.S. patent application Ser. No. 08/382,150, filed Jan. 31, 1995, hereinabove incorporated by reference. These weldments and shafts are themselves major components of a mechanism for raising and lowering of the side rail assembly. Said mechanism is also utilized for lateral translation of the side rail assembly, thereby extending or compressing the lateral dimension of the bariatric treatment system. Details of the manufacture and use of this mechanism will be evident further herein.

The aforementioned mechanism comprises those elements necessary for raising, lowering or laterally translating the left side rail. Weldments are dependently cantilevered, in fixed relation, from shafts. The shafts freely rotate and slide laterally within bushings. These bushings are dependently attached to a mounting plate in fixed position. Pawls are connected by a rod in such manner as to require coordinated motion of said pawls. A plurality of rectangular pegs form teeth on the shafts in such a manner as to form a ratchet mechanism with the pawls. In the preferred embodiment of the present invention, the ratchet mechanism allows the side rail to be raised by lifting only from a lowest TRANSPORT position to either a middle LOWERED position or the upper RAISED position. In order to lower the side rail from the RAISED position to the LOWERED position or from the LOWERED position to the TRANSPORT position, a provided release lever must be manually articulated in order to cause release of the pawls from the teeth of the shafts. From the LOWERED position, the side rail may be freely translated laterally outward from the center of the bed. This configuration is referred to as EXTENDED in the preferred embodiment. From the EXTENDED position, the side rail may be returned to the RAISED position. The side rail, when in the EXTENDED RAISED position, must be lowered prior to translation back toward the center of bed, the NORMAL position. In the TRANSPORT position, the side rail of the preferred embodiment may be further translated toward the center of the bed, to a location beneath the seat assembly, thereby. maximally reducing the overall lateral dimension of the bed. The reduction in lateral width attainable is sufficient so as to be able to fit the bed through a standard hospital doorway. Although the excessive width of bariatric patient treatment beds has long been recognized as an undesirable characteristic for transport, prior art embodiments of bariatric patient treatment beds have failed to provide an economical, reliable and easy-to-manufacture side rail design with multiple functions and abilities for use on a bariatric bed such as that described herein.

As is well known in the art, the bariatric patient 118 is often of such limited mobility as to make it impracticable for such a patient to utilize bed function controls mounted on a side rail. The preferred embodiment of the present invention includes a hand held bed function control pendant 124 which comprises a molded plastic body encompassing necessary electronic hardware, as is common in the industry, and a clip 125 for easy stowage upon a side rail 110. The pendant 124 includes a plurality of push button membrane switches allowing the patient 118 to control such functions as BED UP, BED DOWN, HEAD UP, HEAD DOWN, LEGS UP and LEGS DOWN, as have been previously detailed. The pendant 124 attaches to the swivel mounted main control 117 panel by a cord 126 and plug. An infrared hand held control 127 is also provided in the preferred embodiment. The infrared control 127 comprises the same functionality as does the hard-wired pendant 124 and also comprises a similar attachment clip 128. It communicates with the master controller through an infrared detector, and associated hardware and software, mounted on the underside of the swivel mounted main control panel 117. As will be understood further herein, a serial bus architecture, employed extensively in the preferred embodiment of the present invention, allows simple parallel implementation of the three control units 117, 124, 127.

The therapeutic structure of the bariatric treatment system 100 generally comprises a patient support surface, blower and valve box assemblies, and a patient rotation angle sensing system. The patient support surface 105, normally covered by a sheet, generally comprises a plurality of patient support air cushions 130–133, turning air bladders 135, patient restraining bladders 136 and a percussor bladder. All air bladders in the preferred embodiment comprise a polyurethane coated, impermeable, heavy duty fabric.

The patient support air cushions 130–133 are inflated by air which has been transmitted through a plurality of polyethylene hoses from a blower and valve assembly 137. The plurality of hoses are connected to the cushions sectionally, hence compartmenting air flow into the head section 130, back section 131, torso section 132 and legs section 133. Further, the cushions of the back 131, torso 132 and legs 133 sections are supplied with air from the hoses in alternating fashion. This allows the patient 118 supported upon the surface to receive pulsation therapy as is well known in the treatment and prevention of bedsores, or decubitus ulcers, and other pressure related complications of extended confinement to hospital beds. Pulsation therapy is accomplished by first reducing pressures through the hoses feeding every other bladder in the desired pulsation region, hence deflating the attached cushions. Upon attaining the maximum desired deflation in these cushions air flow is restored through the hoses, again inflating the connected cushions. Simultaneously, with the re-inflation of the first deflated cushions; pressure is decreased in each cushion adjacent those being reinflated, within the pulsation region, by decreasing flow through the hoses connected thereto. Upon attaining the maximum desired deflation in this second group of cushions, and simultaneously the maximum desired inflation in the first group of cushions, the cycle is reversed and repeated. It should be noted that for the purpose of this discussion maximum desired inflation and deflation is determined by the desired therapy intensity which in the preferred embodiment is caregiver selectable as LOW, MEDIUM or HIGH PULSATION. Under the control of the microprocessor systems detailed further herein, this pulsation is available with cycle periods from two to forty minutes. Separation of the air cushions of the back section 131, torso section 132 and legs section 133 also allows independent adjustment of maximum pressures in each region thus allowing more optimal minimization of pressure points against the patient. The cushions 130 of the head section are supplied with air taken from splices 138 into the those hoses which supply air to the back section. The air is first fed into a shuttle and check valve system 139, wherein any pulsation which may be activated is dampened out. In particular a shuttle valve 140 acts to pass the highest pressure air from either of the two lines to a restricted flow port 141. A check valve 142 is provided which allows air flowing to the head section 130 to only pass through the flow port 141. In the event that CPR functions are activated, as will be understood further herein, the check valve 142 allows flow from the head section 130 to pass through the flow port 141 as well as through a much larger port about the check valve 142. The restricted, or dampened, air flow is then directed into the cushions 130 of the head section which exhibit only minimal pulsation effects.

The patient restraint bladders 136 are also inflated through polyethylene hoses which originate from the same blower and valve assembly 137 as do the hoses to the patient support cushions 130–133. In particular, these bladders 136 are inflated from a hose spliced into one set of hoses feeding the torso section 132. A check valve 143 is provided which prevents the restraint bladders 136 from deflating with pulsation therapy. A plurality of bladders 119 is provided for expanded patient support when the bariatric treatment system 100 is in the EXTENDED side rail position, as described hereinabove. The bladders 119 receive inflating air through hoses spliced into the set of hoses feeding the torso section 132 not spliced to the restraint bladders 136. A check valve 144 such as that utilized for the restraint bladders 136 is provided to prevent deflation of the expanded support bladders 119 during pulsation therapy in the torso section 132. When the EXTENDED position is not selected, these bladders are disconnected from their supply hoses and tucked away beneath the back 105b and legs 105c sections of the patient support system 104. A manual three way valve 145 is provided to prevent uncontained discharge of air during the condition where these hoses are disconnected. Except for the modifications as noted hereinabove, the construction and operation of the foregoing inflation structure 146 is substantially identical that disclosed in U.S. patent application Ser. No. 08/673,442, filed Jun. 28, 1996, hereinabove incorporated by reference.

The inflation structure 146 for the turning bladders 135 generally provides for a LEFT ROTATION and a RIGHT ROTATION turn of the patient. A left rotation turn of the patient accomplished by inflation of the left turning bladder 135a through a first hose from the valve block 137 while simultaneously exhausting air in the right rotation bladder 135b through a second hose from the valve block 137. Similarly, a right rotation turn of the supported patient 118 is accomplished by inflation of the right turning bladder 135b through the second hose while simultaneously exhausting air in the left turning bladder 135a through the first hose.

The best mode embodiment of the bariatric treatment system's valve block assembly 137 generally comprises a manifold 147 with a motor mounting plate 148 s supported a distance separated from the manifold by a plurality of industry standard stand-offs. Dependently mounted upon the motor mounting plate is a plurality of 12-volt, reversible direction, direct current motors 149. Each such motor 149 is provided with electrical connection from a positive terminal 150 and a negative terminal 151 through a connector to a relay board, understood further herein. Each motor 149 is further provided with a chassis ground connection 152. Additionally, the valve block assembly 137 comprises a plurality of air tubes 153 which provide air flow to the patient supporting air cushions 130–133, extension and restraint bladders 119, 136, and turning bladders 135 as hereinabove described.

Each valve control motor 149 further comprises a valve control motor shaft 154 connected to a coupling 155 by a pin 156, which coupling 155 further connects to a valve screw 158 by another pin 157. In the preferred embodiment 100, space is conserved by utilizing a valve screw 158 which is of adequate diameter to fit coaxially over the coupling 155, hence eliminating the need for an additional shaft. This reduces the longitudinal dimension of the valve block assembly 137 while utilizing only that space otherwise required due to the diameter of the valve motors 149. Connection of each shaft 154 to its corresponding valve screw 158 via a coupling 155 and pins 156, 157 allows floating of the valve screw 158, promoting self-alignment with the valve spool 159. This design simplifies manufacture and increases reliability of the valve block assembly's operation.

U.S. patent application Ser. No. 08/673,442, filed Jun. 28, 1996, hereinabove incorporated by reference, shows a valve motor with a valve spool in the air inflation position, no flow position and air exhausting positions, respectively. When the valve motor turns in the valve opening direction, the valve screw drives the valve spool away from the valve motor creating a flow path between an internal cavity and the corresponding hose connection tube. The cavity is pressurized by a blower within a provided blower and valve block housing. In an alternate embodiment, without loss of performance, this blower may be mounted separately from the housing and cavity. In such an embodiment, which may be advantageous for conservation of space, the blower would connect to the cavity via an air hose. Air flow between the cavity and tube serves to inflate any air bladders which may be connected. The application shows the valve spool in the closed position so as to block any flow into or out of the corresponding tube. The application also shows the valve spool in the exhausting position. When the valve motor turns in the valve exhausting direction, the valve screw drives the valve spool toward the valve motor creating a flow path between the corresponding tube and the atmosphere. In the exhausting position, air escapes to the atmosphere from whichever bladders may be connected to the tube. Flow to the atmosphere takes place between the manifold and motor mounting plate. Because of the ability to provide control of three way air flows as described, embodiments making use of spool valves are preferred over embodiments which attempt to make use of poppet valves, or other forms of valves which rise perpendicularly to or from their seats. Use of "V" shaped slots in the valve spool bore allows fine control of air flow due to the gradual opening of the air port which is provided by such slots.

In the preferred embodiment, the cavity of the valve block assembly is modified to allow insertion of a nylon thumb screw in order to limit the opening motion of the valve spools under control of the two valve motors utilized to control air flow into and out of the turning bladders. The thumb screw maintains the valve spool position within the region of control of air flow. Such maintenance of the region of control is necessary for the efficient operation of the rotation function control algorithm, detailed further herein. The construction and operation of the valve block assembly 127, as hereinabove summarized, is substantially identical that fully enabled in U.S. patent application Ser. No. 08/673,442, filed Jun. 28, 1996, hereinabove incorporated by reference.

The percussor system 160 of the bariatric treatment system 100 generally includes a blower 161, a valve block 162 (also referred to as a "percussion body") and a solenoid 163. The blower 161 is powered by an internal three speed alternating current motor. Said motor 161 is controlled by an internal circuit board in response to inputs received through direct current channels through a transmission line assembly. The three speeds of the blower allow for three levels of intensity for percussion therapy, LOW, MEDIUM and HIGH PERCUSSION, as will be evident further herein.

The percussor valve block 162 generally comprises a longitudinally articulable rod 164 upon which are mounted first 165 and second valve disks 166. The position of the rod 164 determines the air flow path through the valve block 162 at any given instance. There are generally two conditions. In the first condition, the rod 164 is biased, by a provided wire spring 167, distally from a provided solenoid 163. In this position, the first disk 165 is held away from its seat 168 and the second disk 166 mates with its seat 169, allowing airflow into the percussor valve block 162 to exhaust partially to the atmosphere and partially to the percussor bladder. In the second condition, the solenoid 163 pulls the rod 164 toward itself, thus causing the first disk to mate with its seat and the second disk to be removed from its seat. In this condition, airflow into the valve block from the blower is fully exhausted to the atmosphere. Further airflow form the percussion bladder is also allowed to exhaust to the atmosphere.

The blower 161 operates continuously at a given speed, depending upon the intensity of percussion desired. By splitting the airflow while inflating the percussion bladder, the blower is prevented from entering a dead-head condition in which flow is stalled. This ensures maximum intensity of percussion action as well as prevents overheating of the blower at lower percussion frequencies.

The therapeutic structure of the bed further comprises a hinging system wherein a plurality of straps, comprising heavy duty webbing, are arranged in a criss-cross fashion along the longitudinal axis of the patient support sub-frame. This hinging system is exactly like that disclosed in U.S. patent application Ser. No. 08/673,442, filed Jun. 28, 1996, hereinabove incorporated by reference.

The turning bladders 135 utilized in the presently preferred embodiment of this invention 100 are substantially similar those of U.S. patent application Ser. No. 08/673,442, filed Jun. 28, 1996, hereinabove incorporated by reference, except that only two are provided and these are modified for maximum turning efficiency under a bariatric patient. In particular, internal baffles are provided which maintain the bladder cross section in a right triangular shape with a smaller angle much less than the greater angle. In this manner, the bladder is prevented from assuming a cylindrical shape and thereby places maximum area (that of the hypotenuse panel) in contact with the underside of the patient support surface. The zippering and other features described in application Ser. No. 08/673,442 remain as disclosed.

The patient rotation angle sensing system is identical that disclosed in U.S. patent application Ser. No. 08/673,442, filed Jun. 28, 1996, hereinabove incorporated by reference. The angle sensor therein described is further utilized in two additional places in this present invention. Angle sensors 113 are placed on the articulating members connecting the load frame to the mid-frame. System software performs trigonometric calculations upon the measured angle data in order to accurately estimate the exact patient orientation. This information allows the bariatric treatment system to assume a number of given positions, such as TRENDELENBURG and others, automatically at the press of a control panel button.

A power inverter, rechargeable batteries, circuit breaker, relay and connecting brackets and the like are maintained in the lower frame assembly. Such components provide the bariatric treatment system with standard AC power supply and, alternately, an AC-like power supply from the rechargeable batteries. The power system is identical to that disclosed in U.S. patent application Ser. No. 08/673,442, filed Jun. 28, 1996, hereinabove incorporated by reference.

Functional control of bed and therapeutic features is provided through an integrated hardware and software implementation 170. In general, the functional aspects of the bariatric treatment system 100 may be summarily described as comprising a master board and display system 171 with infrared receiver board 172, a communications logic board 173, a sensor board 175, a relay board 176, a percussor board 174, a scale board, an infrared transmitter system 179, and a power supply and battery backup system 178, all in operable communication with a plurality of jack motors and the therapeutic patient treatment system along with various pressure sensors, angle sensors, infrared sensors and limit switches, integral therewith.

The master board 171 of the preferred embodiment of the present invention 100, implemented on a four layer printed circuit board (PCB) with power and ground planes, is designed about a trademark "INTEL" device number 80C32 microcontroller, commercially available from the Intel Corporation of Santa Clara, Calif. The master board is powered by a direct current to direct current (DC-DC) converter which converts 12 volt direct current (Vdc) power from the bariatric treatment system power supply to 5-Vdc power, which is regulated by a provided 5-Vdc regulator. The DC-DC converter ensures the presence of sufficient power at the master board in order to prevent voltages sags incident varying demand in the general power distribution scheme. The 80C32 microcontroller operates at a clock rate of 11.0592 mega-Hertz (MHz), as provided by an on-board crystal oscillator circuit. As is understood by those of ordinary skill in the art, clocking at 11.0592 MHz allows generation of industry standard baud rates, utilized throughout the bariatric treatment system for serial communications between the various provided integrated hardware and software control circuits. The 80C32 includes an integral universal asynchronous receiver and transmitter (UART) for serial communications with peripheral boards, as will be understood further herein.

The master board also includes a WaferScale Integration (WSI) device number PSD313 programmable microcontroller peripheral with erasable memory, commercially available from WaferScale Integration, Inc. of Fremont, Calif., which comprises a 128 kilobyte (Kbyte) ultraviolet erasable programmable read only memory (UV EPROM), of which 64 Kbyes are utilized by the 80C32 for program storage, and a 2 Kbyte static random access memory (SRAM), utilized by the 80C32 for storage of software control variables. The PSD313 also provides programmable arrays, utilized by the master board software for memory mapping and creation of data input and output (I/O) ports.

The master board includes a trademark "BENCHMARQ" device number bq3287EMT real-time clock (RTC) module, commercially available from Benchmarq Microelectronics, Inc. of Carrollton, Tex. The bq3287EMT is utilized by the 80C32 for error logging and time and date stamping of patient weight information, each understood further herein.

The bq3287EMT also provides 242 bytes of non-volatile SRAM, utilized by the 80C32 for storage of system parameters and diagnostic error logs.

A trademark "DALLAS SEMICONDUCTOR" device number DS1232 micromonitor chip, commercially available from the Dallas Semiconductor Corporation of Dallas, Tex., is utilized by the 80C32 as a watchdog timer, as is understood by those of ordinary skill in the art. The DS1232 provides a hard reset to the 80C32 in the event of a software failure, as will be understood further herein.

The display system of the bariatric treatment system generally comprises a plurality of membrane switches and a vacuum fluorescent display (VFD), commercially available from Futaba of, configured for six lines of 40 characters per line. Interface from the master board to the membrane switches is directly provided for by external data ports of the 80C32. The membrane switches are electrically arranged in a matrix. Depression of any single membrane switch shorts one row to one column. The 80C32 successively writes to each row of membrane switches while rapidly reading each column of membrane switches. In this manner, the 80C32 determines whether any row and column is shorted together, thereby indicating depression of a particular membrane switch. Interface from the master board to the VFD is provided by a trademark "MOTOROLA" device number M68HC11 single-chip microcontroller, commercially available from Motorola, Incorporated's Motorola Semiconductor Products Sector of Phoenix, Ariz., The M68HC11 formats display driver data from the 80C32 and then passes the formatted data to the VFD through a 34 pin flat ribbon connector.

Two distinct serial communications busses are supported by the master board. A trademark "NATIONAL SEMICONDUCTOR" device number DS36276 FAILSAFE multipoint transceiver, commercially available from the National Semiconductor Corp. of Santa Clara, Calif., is utilized on the master board to implement a six-wire RS-485 bus. Those of ordinary skill in the art will recognize that the RS-485 bus is the recommended standard of the Electronic Industries Association (EIA) for specifying the electrical characteristics of generators and receivers used in balanced digital multipoint systems. The RS-485 standard is also sometimes referred to as the EIA-485 standard, without loss of meaning. A second bus of eight wires, proprietary to Kinetic Concepts, Inc. (KCI) of San Antonio, Tex. and referred to as a KCI bus, is provided for direct interface to any peripheral board not implementing the RS-485 standard. A discretely implemented low power, dual metal oxide semiconductor field effect transistor (MOSFET) driver circuit provides interface from the master board to the KCI bus. As will be understood further herein, and particularly after discussion of the communications logic board, communications signals on the RS-485 bus and the KCI bus are logically mirrored such that all signals appearing on one bus are simultaneously transmitted on the other. Signals from the master board are simultaneously transmitted by direct electrical connection to both busses. Signals to the master board, which are logically identical, arrive either from the RS-485 bus or from the KCI bus, according to the placement of a jumper switch on the master board. Irrespective of which bus is utilized, all serial communications to or from the master board are through the communications logic board as will be more fully understood herein. Electrical interface between the master board and the communications logic board is provided for through a six-pin modular connector to the RS-485 bus and an eight-pin modular connector to the KCI bus.

The master board extensively utilizes memory mapping—a listing of all the memory assignments as implemented in the program software, categorized as either program space or data space. Memory mapping allows the 80C32 to identify the amount of memory required, the locations of data or subroutines, and those memory locations not allocated or utilized. In the preferred embodiment of the present invention, the memory mapping allocates 64 Kbyes as program space and 64 Kbyes as data space which also includes I/O port allocations. The 80C32 reads system program instructions from the program space and, as required, reads from and writes to the various peripheral devices, as is understood by those of ordinary skill in the art, in order to effect or utilize system parameters, error logs, membrane switch I/O, VFD driver data and software control variables. The provided memory mapping is summarized in Table 1: Master Board Memory Mapping. This table specifies whether the 80C32 reads (R), writes (W) or reads and writes (R/W) particularly addressed, as delineated in hex (Address Range), system program instructions (PROG) or data and I/O (DATA) out of or into the space (Space) allocated to a particular device (Device). The table also includes an abbreviated summary of the function (Function) implemented under each assignment.

TABLE 1

Master Board Memory Mapping

| R/W | Address Range | Space | Device | Function |
|---|---|---|---|---|
| R | 0-xFFFFh | PROG | PSD313 | Program instruction |
| R/W | 0-x1FFh | DATA | bq3287EMT | System parameters/error logs |
| R/W | x200h-x3FFh | DATA | Ext. Data Ports | Membrane switch I/O |
| W | x400h-x5FFh | DATA | M68HC11 | VFD driver data |
| R/W | x2000h-x27FFh | DATA | PSD313 | Software control variables |
| R | x4000h-xFFFFh | DATA | PSD313 | Reserved |

A detailed schematic drawing of the master board 171 is provided at FIGS. 16A, 16B, 16C, and 16D This detailed schematic is enabling, to those of ordinary skill in the art, of the above-recited structure and function.

The communications logic board 173 may be summarily described as the central node of a star architecture implementation of the dual communications bus structure (RS-485 and KCI) of the preferred embodiment of the present invention. This implementation is effected through provision of six six-pin modular connectors for RS-485 bus connectivity, six eight-pin modular connectors for KCI bus connectivity, and one DB-9 connector and three four-pin modular connectors for RS-232 serial communication line connectivity. Those of ordinary skill in the art will recognize that RS-232 is the EIA recommended standard for single-ended data transmission, that is data transmission using only one signal, at relatively low data rates (up to 20 kilo-bits per second (Kbps)) over short distances (typically up to ~50 feet). As will be further understood herein, the board, implemented on two four layer PCBs each having power and ground planes, creates a logical mirror between the RS-485 bus and the KCI bus and between these busses and two provided RS-232 serial communications jacks. The two PCBs of the communications logic board, electrically interconnected through a 32 wire flat ribbon cable, may be stacked or placed side-by-side according to the physical constraints of the particular embodiment in which they are implemented. An LM294OCT-5 linear voltage regulator supplies regulated 5-Vdc power to the communications logic board.

The communications logic board of the preferred embodiment of the present invention, is designed about a trademark "ALTERA" device number EPM7032 programmable logic device (PLD), commercially available from the Altera Corporation of San Jose, Calif. The EPM7032 operates at a clock rate of 3.6864 MHz, as provided by an on-board crystal oscillator circuit. As is understood by those of ordinary skill in the art, clocking at 3.6864 MHz is compatible with implementations of industry standard baud rates as are utilized throughout the bariatric treatment system. The EPM7032 is custom designed to create a logical mirror between the RS-485 bus, the KCI bus, and the RS-232 serial communications lines. As will be understood herein, appropriate driver and buffer circuitry is provided whereby all electrical communications to or from the various serial communications busses and lines are provided within transistor transistor logic (TTL) electrical standards. In order to prevent latching and collision, the three inputs to the EMP7032 are successively sampled at the 3.6846 MHz clock rate through latching of the EMP7032's internal gates. Upon detection of a signal on any of the three input lines, the EMP7032 is programmed to (1) disable sampling of the next two input lines, thus preventing collision, and (2) disable the output of the sampled input and disable the inputs of the two non-sampled outputs, thus preventing latching of the outputs. On the next clock cycle, the sampled input data is transmitted on the outputs of the two non-sampled lines. This process is very rapid, the only delay being one clock cycle and propagation time. Because the EMP7032 is clocked at a much higher rate than the maximum data transmission rate of 19.2 Kbaud, the delay incurred through the mirroring operation is only about five ten-thousandths of a bit.

As briefly discussed above, all signals to or from the EMP7032 are at TTL voltage levels. A trademark "NATIONAL SEMICONDUCTOR" device number DS36276 FAILSAFE multipoint transceiver, commercially available from the National Semiconductor Corp. of Santa Clara, Calif., is utilized on the communications logic board to implement a six-wire RS-485 bus through the provided RS-485 bus modular connectors. In accordance with the RS-485 standard, the DS36276 converts TTL voltage levels (0 to 5-Vdc) to differential voltage levels, and vice versa. A discretely implemented MOSFET driver circuit provides interface from the communications logic board to the KCI bus through the provided KCI bus modular connectors. The MOSFET driver circuit converts TTL voltage levels to voltage levels compatible with the KCI standard, and vice versa. As will be understood, the interface from the communications logic board and the RS-232 serial communications lines is designed about a trademark "INTEL" device number 87C52 microcontroller, commercially available from the Intel Corporation of Santa Clara, Calif.

The 87C52 microcontroller operates at a clock rate of 11.0592 MHz, as provided by an on-board crystal oscillator circuit. The 87C52 includes an integral UART for serial communication of RS-232 I/O to or from the EMP7032. Because, in the preferred embodiment of the present invention, the RS-485 and KCI busses operate at 19.2 Kbaud and the RS-232 serial communications lines may operate at higher or lower data rates, depending upon the peripheral device connected thereto, buffering may be necessary, on a case-by-case basis, between the 87C52 and the EMP7032.

A trademark "HITACHI" device number HM62256 high-speed CMOS SRAM provides 32 Kbytes of static memory for buffering between the 87C52 and the EMP7032. Such buffering is required as many serial devices which may be utilized operate at baud rates different form the RS-485 and KCI busses. The serial communication lines are implemented with four trademark "MAXIM" device number MAX239 multi-port RS-232 drivers. A Phillips Semiconductor device number SC26C94 Quad UART provides interface between the SC26C94 and the 87C52.

Transorbs are provided on each serial communication line in and out of the communications logic board for protection against power surge and electro-static discharge (ESD). Each connector further comprises a separately fused 12-Vdc power supply connection. In the preferred embodiment of the present invention, one of the RS-232 serial lines is used to connect to the battery backup system, or inverter module; three of the KCI serial bus connectors are used to connect the percussor board, sensor board, and scale board; and two of the RS-485 serial bus connectors are used to connect the relay board and master board.

Figure 2:
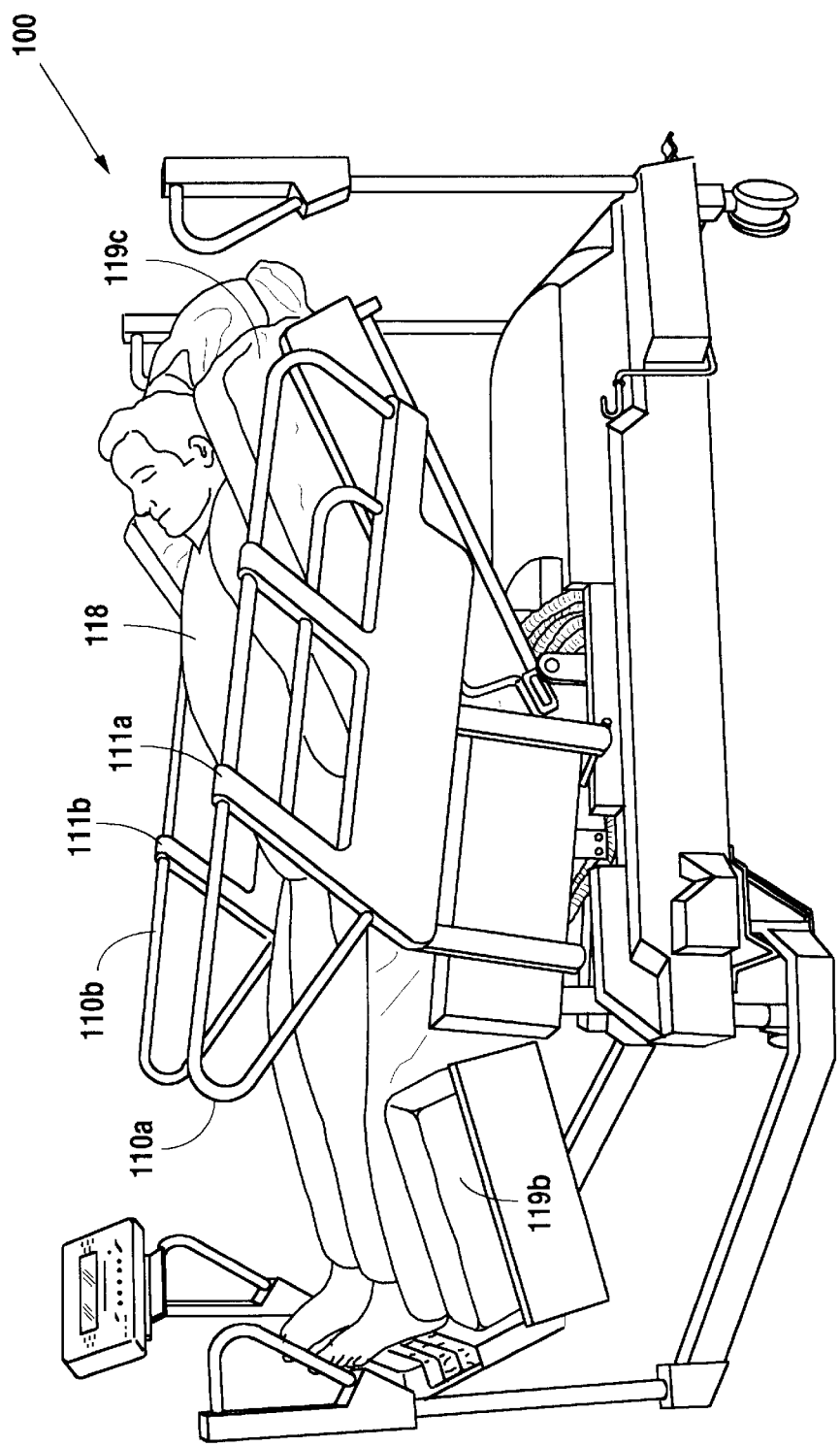
Figure 3:
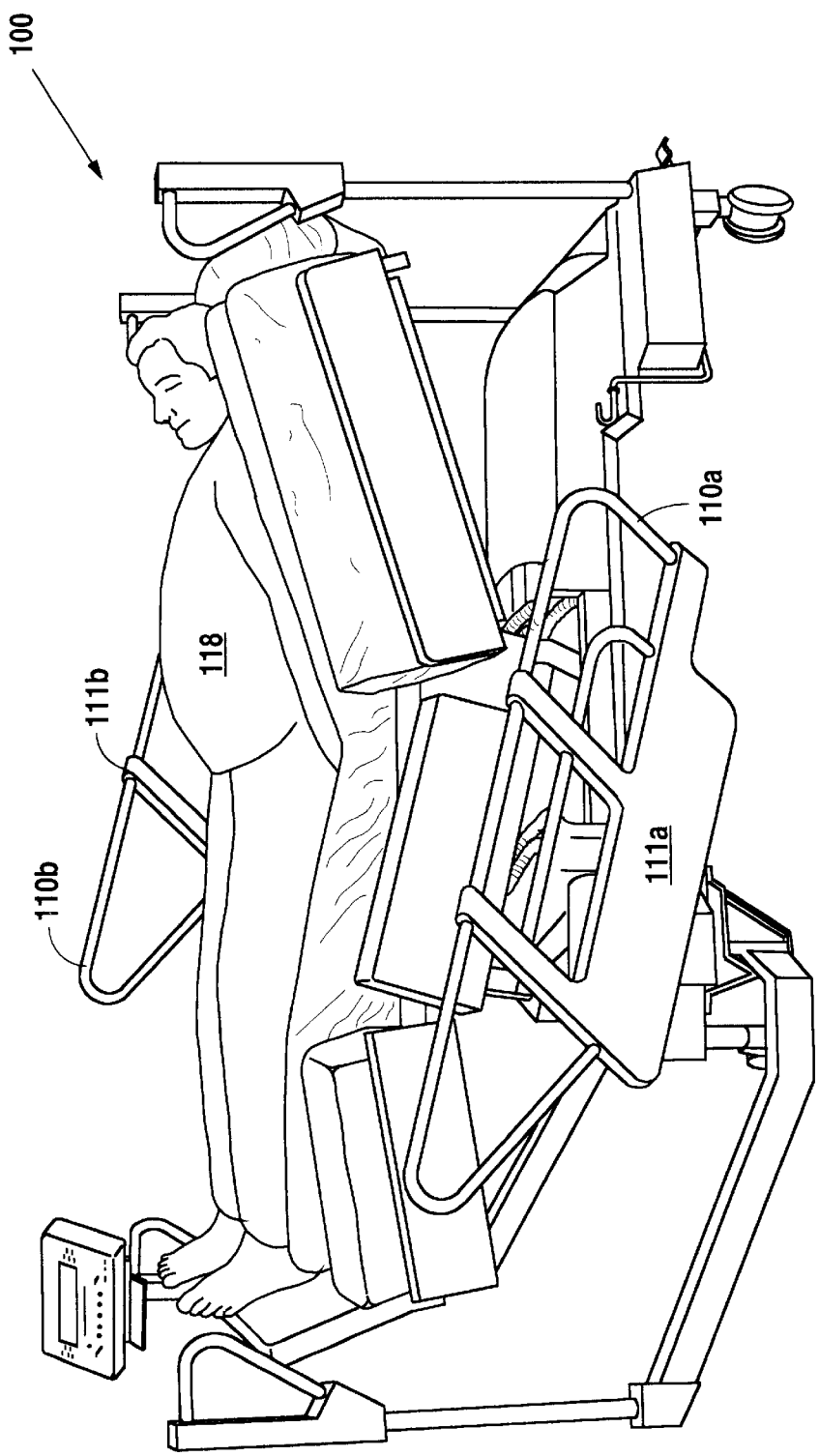
Figure 4:
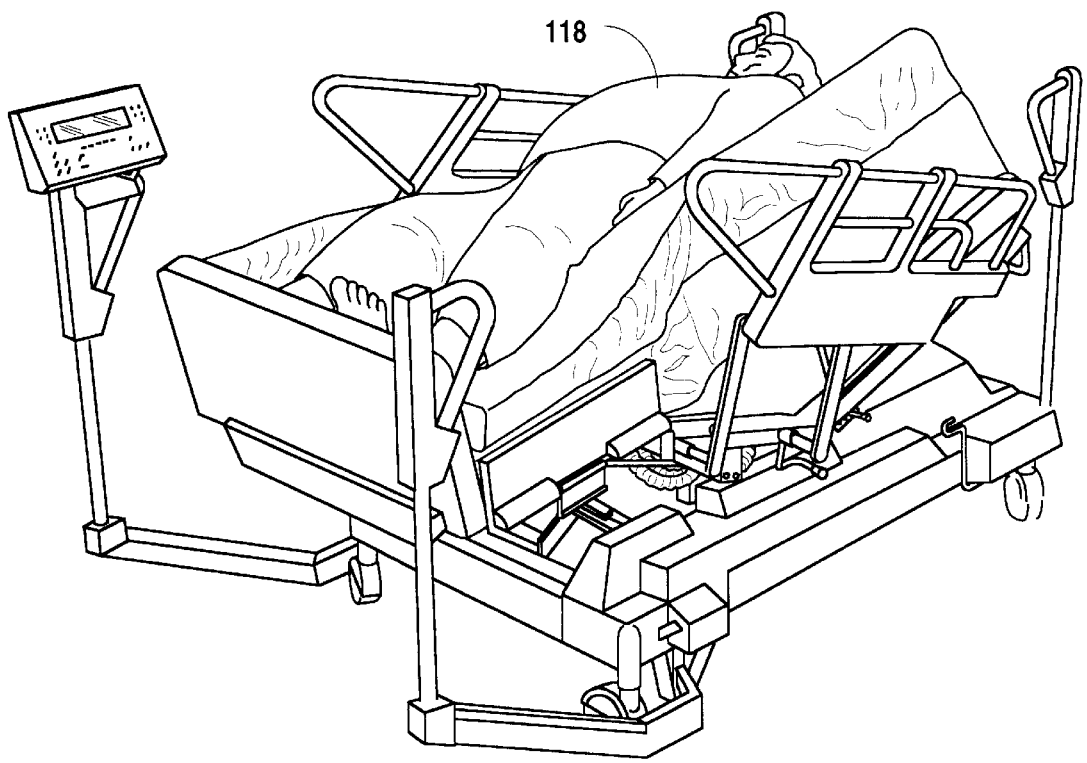
Figures 1, 20A:
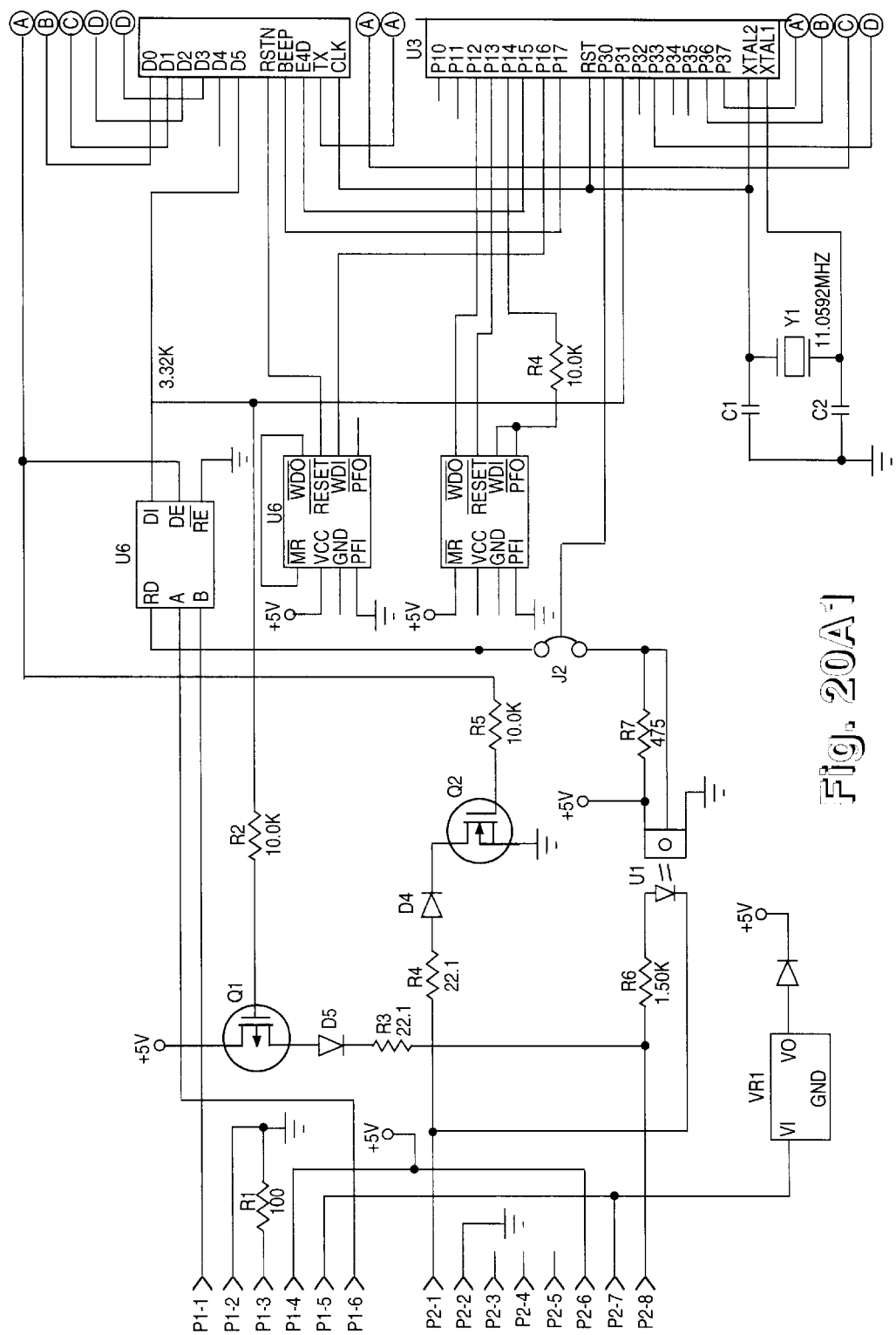

FIGS. 17A, 17B, 17C, 17D, and 17E provide a detailed shematic drawing of the communications logic boards, fully enabling to those of ordinary skill in the art. FIGS. 18A, 18B, 18C, 18D, 18E and 18F provide a detailed schematic of the sensor board. FIGS. 19A, 19B, 19C and 19D provide a detailed schematic of the relay board. FIGS. 20A1 and 20A2 provide a detailed schematic of the infrared receiver board. FIGS. 20B1 and 20B2 provide a detailed schematic of the infrared transmitter board. Each of these schematics is fully enabling to those of ordinary skill in the art.

All software is disclosed in the software appendix, Appendix II, comprising flow charts enabling to those of ordinary skill in the art of software design and engineering. By this reference, Appendix II is incorpated herein as though now set forth in its entirety. An executive summary of much of the provided function is given in the following. The master board software controls 19.2 Kbaud serial communications to the six peripheral boards within the bariatric treatment system. The software is responsible for initiating and terminating all serial communications. The software monitors and updates numerous global and local variables based upon input from the six peripheral boards and switch inputs from the membrane switches of the control units. The software also writes menu screens to a Vacuum Fluorescent Display (VFD) by writing display data to a register which serves as a mailbox for another on-board processor which is tasked with updating the VFD. The software includes menu screens for setting up various therapies, including rotation, pulsation, percussion, inflation, and deflation of the seat section. The software further includes diagnostic screens for viewing error logs, software versions of software installed on the peripheral boards, membrane switch testing, mattress air hose plumbing testing, real-time clock time and date adjustments, and sensor screens for viewing the data from the peripheral boards in real-time. The software includes switch handling code to process inputs from the membrane switches of the bed's swivel mounted control panel. The software includes safety features to cancel rotation due to various bed position conditions and includes code for emulation of the standard C programming language input/output "printf( . . . );" command, including decimal, integer, and hexadecimal conversion characters.

The sensor board software controls the bed's air system directly with motor control code for the bed's valve box, blower control code for the bed's main air blower, and therapy control code for maintaining and controlling therapies such as Pulsation, Rotation, Instant Inflation (INSTAFLATE), and Seat Deflate. This software also reads the analog inputs from up to 16 analog sensors and switches and utilizes these inputs in the process of controlling the bed's multiple therapies. Such inputs include an Auxiliary CPR Switch for shutting off the air system in the event that serial communications with the master board are terminated. Therapies are generally, but not exclusively, controlled by the software by comparing a set of target pressure and angle values with the actual pressure and angle values as seen by the analog to digital converter, and then using various software functions to adjust the air pressures in various bladders as required. A serial protocol is included in the software to enable 19.2 Kbaud communications by the sensor board with the master board.

The percussor board software controls the intensity of the percussor blower, the frequency of the percussor solenoid (which in turn determines the frequency of percussion), and the activation of both the blower and the solenoid. The blower is controlled with a pulse-width signal which is generated with an internal microcontroller timer. The software includes a diagnostic mode for testing the microcontroller ports and the board's RAM. A communications time-out counter is also included in the software to provide a fail-safe response during board operation in cases where communications are momentarily or completely lost. A serial protocol is included in the software to enable 19.2 Kbaud communications by the percussor board with the master board.

The scale board software generates a 3600 Hz on-board clock pulse to stimulate two Linear Variable Differential Transformers (LVDTs) and switch a signal rectifier. The software controls and reads the analog output in 16-bit digital format from an on-board Analog-to-Digital Converter (ADC). The digital output is converted into English pounds and Metric kilograms by the master board software. A serial protocol is included in the software to enable 19.2 Kbaud communications by the scale board with the master board.

The relay board software provides user control of the four on-bed jack motors for articulation of the three bed surface sections. The software also provides the user with four programmed bed positioning sequences including Patient Exit, Cardiac Chair, CPR, and One-Position Weighing for the Scale. The software cooperates with the sensor board software to provide for deflation of the bladders beneath the patient's legs during Patient Exit. In this manner, any tendency for the patient to slide while exiting the bed is sharply reduced. A serial protocol is included in the software to enable 19.2 Kbaud communications by the relay board with the master board. A communications time-out counter is also included in the software to provide a fail-safe response during board operation in cases where communications are momentarily or completely lost. Angle sensor data from the sensor board is utilized by the relay board software to calculate the height of the head and foot section jack, and to calculate the Trendelenburg angle of the bed.

The high resolution angle control algorithm is implemented in the same manner as that disclosed in U.S. patent application Ser. No. 08/673,442, filed Jun. 28, 1996, hereinabove incorporated by reference.

The preferred embodiment of the invention herein disclosed is designed to offer a comprehensive system of pulmonary and skin care therapies for the critically ill, immobilized patient. Simple procedures have been developed to allow the caregiver and/or patient maximum means to access and operate the myriad functions offered. The operation of these controls is substantially identical that disclosed in U.S. patent application Ser. No. 08/673,442, filed Jun. 28, 1996, hereinabove incorporated by reference.

The operation is summarized in Appendix I, a duplication of the Quick Reference Guide for the commercial product representing the presently preferred embodiment of the invention disclosed herein. It is believed that this Quick Reference Guide is being published on a date commensurate with the filing of this present application. By this reference, Appendix I, including all drawings and other parts thereof, is incorporated herein as though now set forth in it's entirety Although the present inventions have been described in terms of the forgoing embodiments, this description has been provided by way of example only and is not to be construed as a limitation on the invention, the scope of which is only limited by the following claims. Those skilled in the art will recognize that many variations, alternations, modifications, substitutions and the like are ready possible to the above-described embodiments. Only a partial sampling of such variations have been pointed out herein.

We claim:

1. A bariatric patient support system comprising:
   a frame adapted to support patients having weights in the range of about 500 pounds to about 800 pounds;
   said frame including an articulatable mattress support for supporting a mattress, said support including at least first, second, and third articulatable sections positioned to support a leg region, a seat region, and a head region, respectively, of the mattress supported on said support;
   a raise-and-lower mechanism for generally raising and lowering said mattress support relative to said frame;
   an articulation mechanism for articulating the mattress support from a relatively horizontal, lying position to a seated position; and
   at least two inflatable bladders for laterally rotating the head section of the mattress with respect to the leg section of the mattress, said bladders being alternately inflatable in a manner causing one side of the patient to be raised relative to the other side.

2. The bariatric patient support system of claim 1, wherein said bladders are essentially right-triangular in cross section.

3. The bariatric patient support system of claim 2, wherein said bladders each comprise a base and a side, each said base having a transverse dimension substantially greater than the height of each said side.

4. The bariatric patient support system of claim 1, further comprising a foot board assembly dependently attached to said first articulatable section, said foot board assembly being adapted to pivot with respect to the leg region of the mattress through a pivot angle.

5. The bariatric patient support system of claim 4, wherein said pivot angle is defined such that said foot board assembly can be pivoted from a position which is substantially perpendicular to the leg region of the mattress to a position which is substantially coplanar with the leg region of the mattress.

6. The bariatric patient support system of claim 5, wherein said foot board, when pivoted to a position substantially perpendicular to the leg region of the mattress, is adapted to support the entire weight of the patient.

7. The bariatric patient support system of claim 1, further comprising a therapeutic mattress system, said therapeutic mattress system being adapted to rest upon said articulatable mattress support.

8. The bariatric patient support system of claim 7, wherein said therapeutic mattress system comprises an inflatable patient support surface.

9. The bariatric patient support system of claim 8, wherein said therapeutic mattress system further comprises:

a source of pressurized gas;

a gas distribution system in fluid communication with said source and said inflatable patient support surface, said distribution system being adapted to regulate flow of gas from said source to said inflatable patient support; and a controller, said controller being adapted to control said source and said distribution system to provide therapeutic treatment to the patient.

10. The bariatric patient support system of claim 9, wherein said controller is adapted to provide pulsation therapy to the patient.

11. The bariatric patient support system of claim 9, wherein said controller is adapted to provide percussion therapy to the patient.

12. A bariatric patient support system comprising:

a frame adapted to support a patient having a weight in excess of 600 pounds;

said frame including an articulatable support for supporting the patient, said support including at least first and second articulatable sections positioned to support a leg region and a torso region, respectively, of the patient supported on said support;

an articulation mechanism for articulating the support from a relatively horizontal, lying position to an articulated, head raised position; and at least two inflatable bladders for laterally rotating the patient supported on the support, said bladders being inflatable in a manner causing one side of the patient to be raised relative to the other side.

13. The bariatric patient support system of claim 12, further comprising a raise-and-lower mechanism for generally raising and lowering said support relative to said frame.

14. The bariatric patient support system of claim 12, further comprising a controller adapted to cause said inflatable bladders to laterally rotate the patient to one side exclusive of the other side.

15. The bariatric patient support system of claim 12, further comprising a mattress supported by said articulatable support, said mattress being adapted to articulatably support the patient.

16. The bariatric patient support system of claim 15, wherein said mattress comprises an inflatable patient support surface.

17. The bariatric patient support system of claim 16, wherein said inflatable patient support surface comprises a low air loss construction.

18. The bariatric patient support system of claim 16, wherein said inflatable patient support further comprises a therapeutic patient treatment modality.

19. The bariatric patient support system of claim 18, wherein said patient treatment modality comprises pulsation therapy.

20. The bariatric patient support system of claim 18, wherein said patient treatment modality comprises percussion therapy.

21. A bariatric patient support system comprising:

a frame adapted to support a patient having a weight in excess of 600 pounds;

an inflatable patient support adapted to rest substantially atop said frame; and at least two inflatable bladders for laterally rotating the patient, said bladders being inflatable in a manner causing one side of the patient to be raised relative to the other side.

* * * * *